Figure 1:
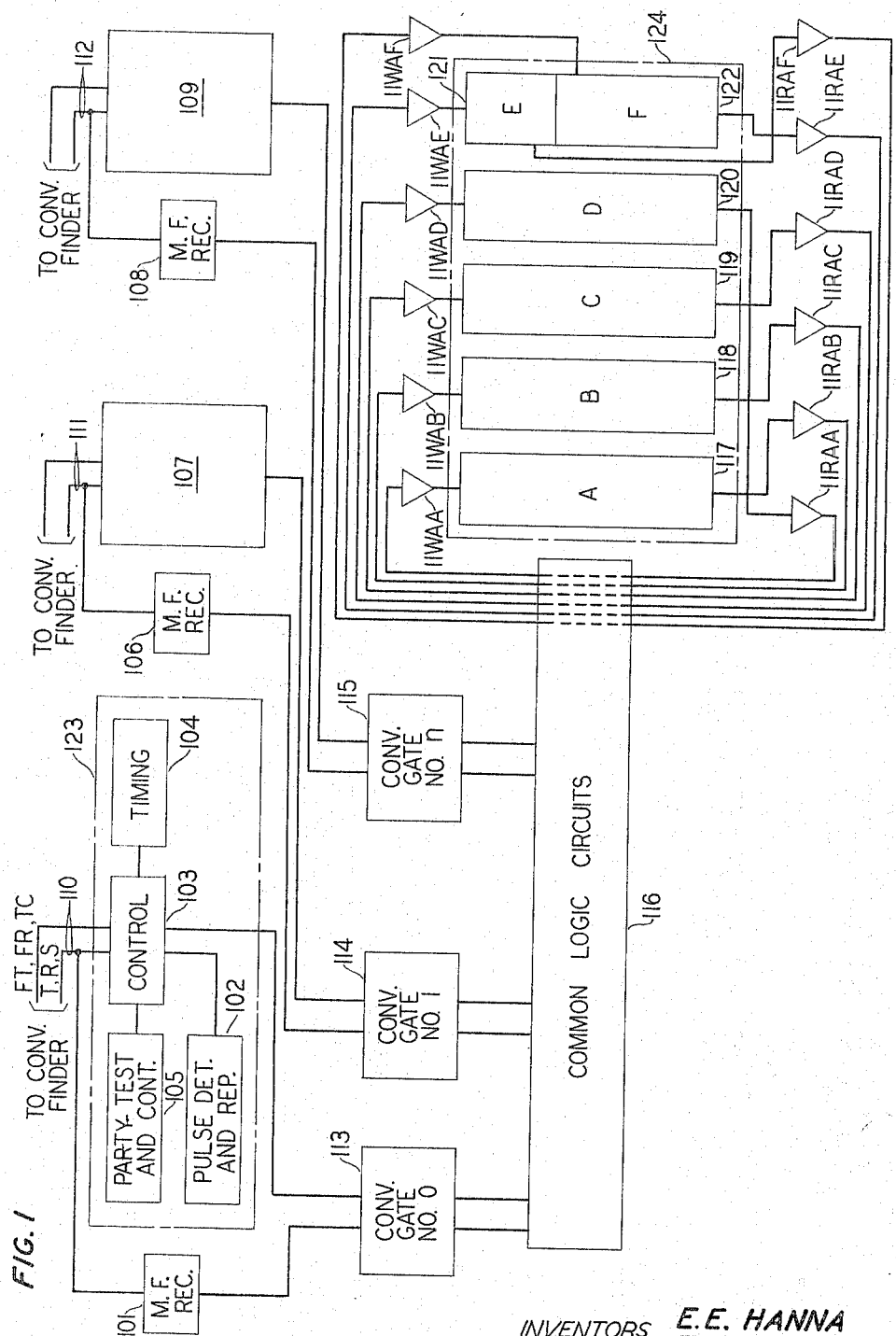

INVENTORS E. E. HANNA
T. N. LOWRY
BY
William F. Simpson,
ATTORNEY

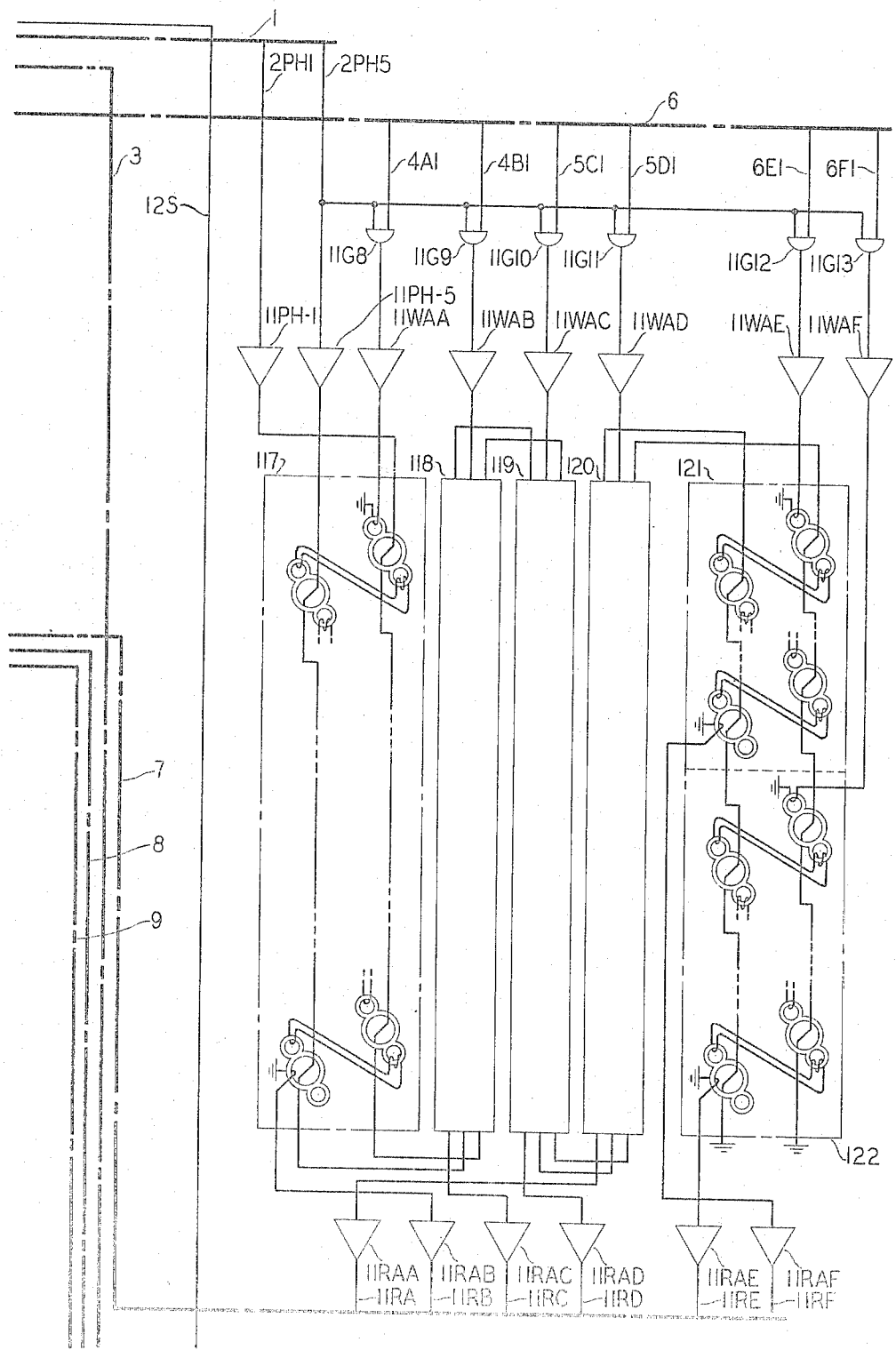

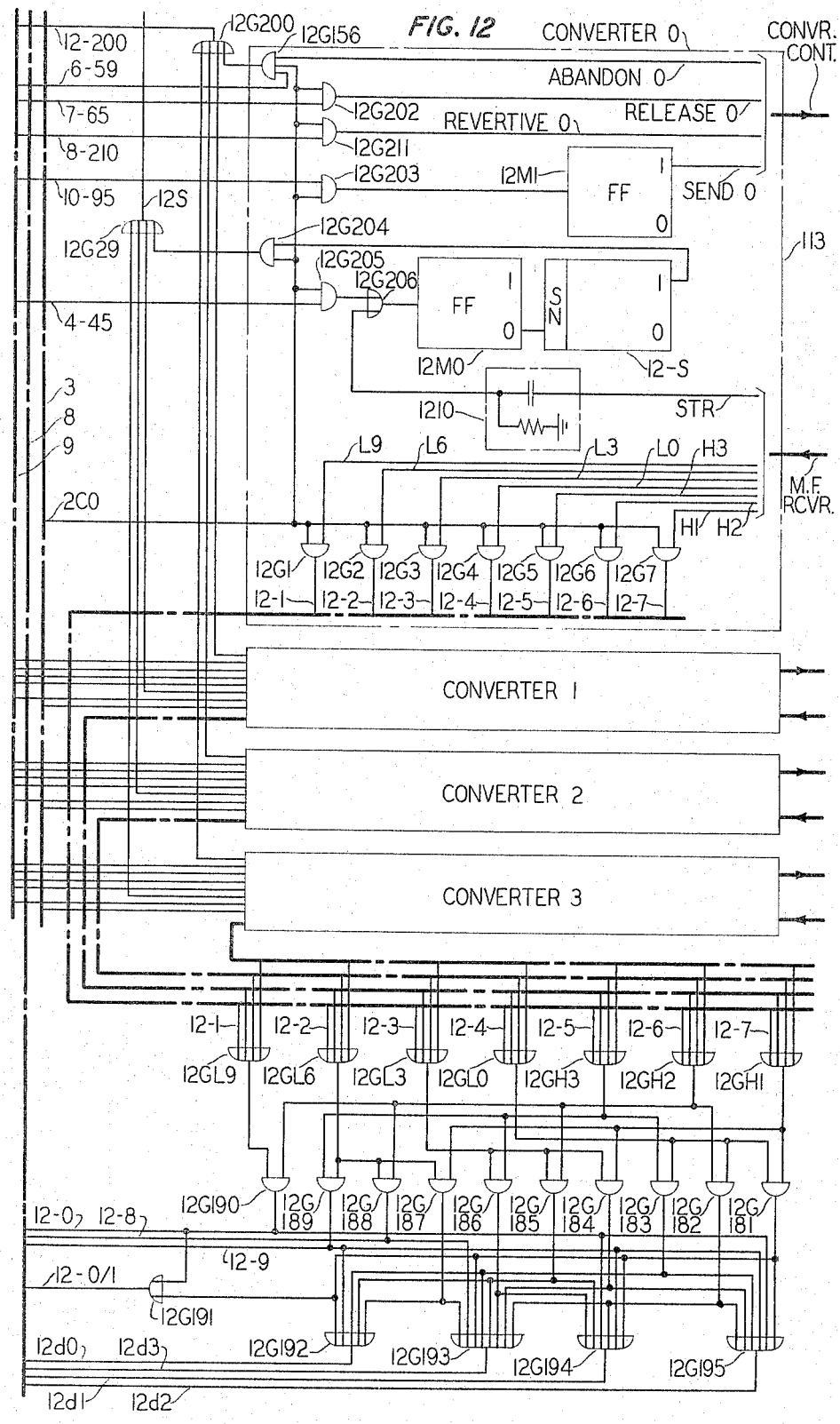

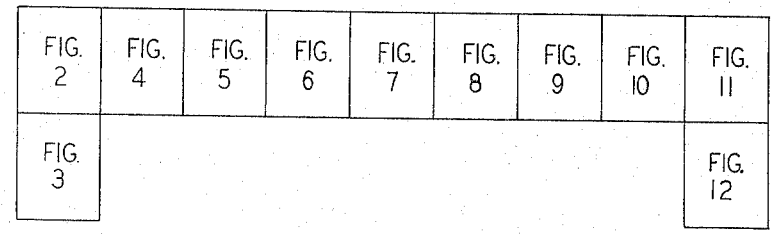
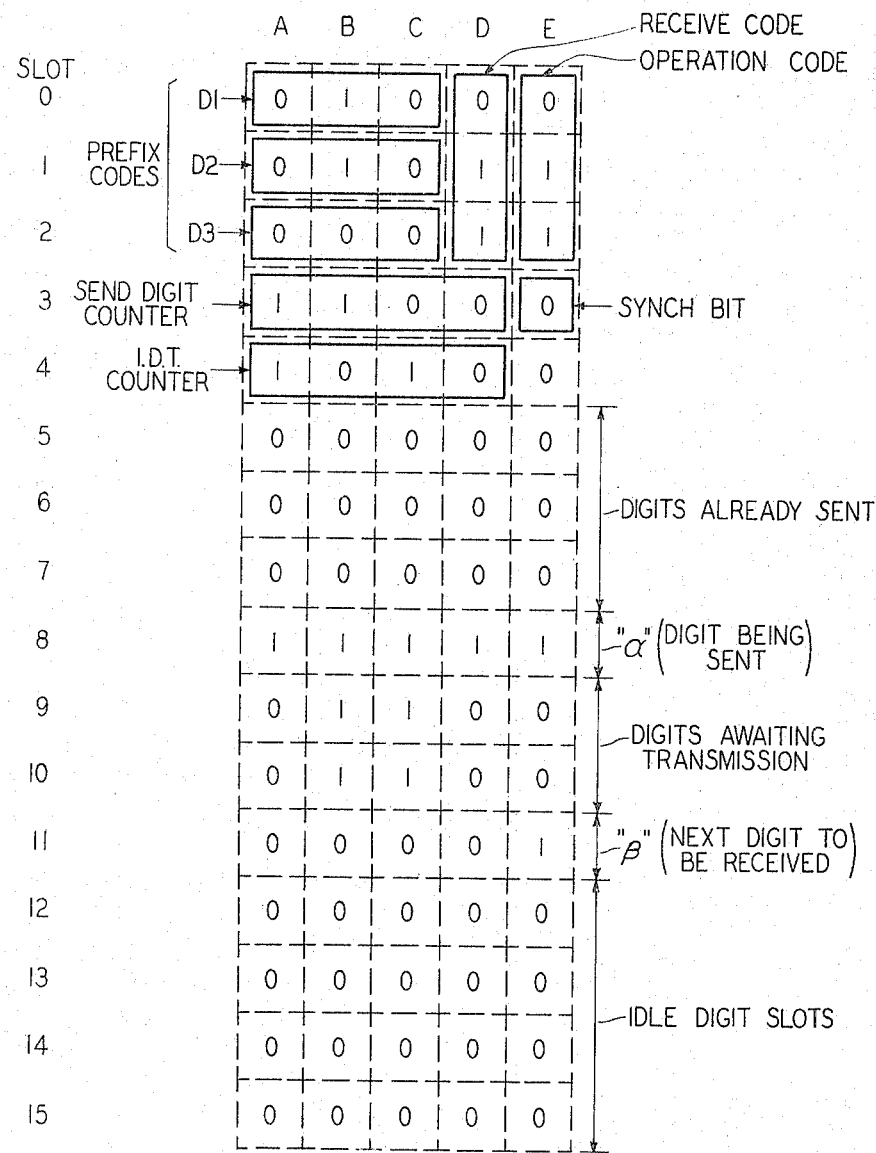

United States Patent Office 3,316,355
Patented Apr. 25, 1967

3,316,355
CIRCULATING STORE FOR SIGNAL CONVERTERS
Edward E. Hanna, Brooklyn, N.Y., and Terrell N. Lowry, Columbus, Ohio, assignors to Bell Telephone Laboratories, Incorporated, New York, N.Y., a corporation of New York
Filed Oct. 11, 1963, Ser. No. 315,495
15 Claims. (Cl. 179—18)

This invention relates to automatic telephone switching systems and to means for translating multifrequency calling signals to serial trains of pulses similar to dial pulses.

More particularly this invention is directed to improvements over the arrangements shown in F. C. Kuchas Patent 3,133,155, issued May 12, 1964; G. Riddell Patent 3,231,675, issued Jan. 25, 1966; and the patent application of E. E. Hanna, A. W. Kettley and T. N. Lowry, Ser. No. 281,137, filed May 17, 1963.

In the patents of F. C. Kuchas and G. Riddell and in other prior art arrangements each converter is self-contained and performs all the necessary functions without the use of any common equipment. Such arrangements are advantageous and economical when electro-mechanical relays and related types of switching equipment are employed.

In the above-identified application of E. E. Hanna, A. W. Kettley and T. N. Lowry, electronic translating equipment is shown for translating multifrequency signals received from a calling subsriber into series of pulses similar to dial pulses suitable for the operation of step-by-step switches. In that application a multichannel signal store is employed in common by a plurality of converters. The channels of this signal store are operated in parallel but the entire store is employed sequentially for each of the various converters in turn.

In accordance with our invention more efficient use is made of the high speed capabilities of electronic equipment and particularly high speed stores. In accordance with our present invention a multichannel signal store is again employed; however, while the channels are operated in parallel for the receiving of signals, they are operated serially for the control of the transmission of serial series of pulses similar to dial pulses. In addition, the store is used in sequence by different converters to which it is common.

An object of our invention is to provide an improved signal store and method of operation thereof. In accordance with our invention a multichannel circulating signal store is provided in which the various channels are operated in parallel. Upon each complete cycle, circulation, or pass of the information around the store the information recorded in each channel is moved one bit space or channel so that upon completion of $n$ circulations or $n$ passes, where $n$ is the number of bits in each stored word or the number of channels involved, the bits are all restored to their original places or positions in the respective channels in the store.

A feature of our invention is related to our improved method of store control in which each bit of a stored word is successively applied to a single group of control circuits for changing or processing the stored word in a prescribed manner.

A feature of our invention relates to a circulating store which is operated in parallel for entering and reading out stored information and in which information stored therein may be altered serially bit-by-bit by the same control equipment.

A feature of our invention is directed to adding 1 to a stored word by causing the bits thereof to be successively read out and applied to a single control position where they are altered by the logic circuit before being restored in the circulating memory.

Another feature of our invention is related to adding 1 to a plurality of binary numbers stored in a circulating memory by causing each bit to be successively read out and presented to a single control circuit where it is altered and then read back into the circulating memory.

A feature of our invention is to add 1 to a binary number by successively changing each bit thereof until a 0 in said number is encountered. Such 0 is then changed but the higher significant bits are not changed.

Another feature of our invention is directed to the pre-translation of a plurality of digits of a called number as they are received. Then when all of the desired digits have been received a final translation of these digits is made to determine the number of digits to be converted or otherwise processed by the converter equipment for each individual call.

Another feature of our invention is directed to means for insuring that the control circuits and the slots within the circulating storage or memory device remain in synchronism.

Another feature of our invention relates to control circuits for a circulating memory for recording in the memory control codes designating the next type of operation to be performed on the stored information words or numbers.

Another feature of our invention relates to employing a recording signal to designate the location of the next word to be recorded.

Another feature of our invention relates to a designating signal designating the location of a word being read out or transmitted from the circulating storage device.

Another feature of our invention relates to circuit means for comparing the relative position of a signal designating the position in which the next received signal is to be recorded and the signal designating the position from which a signal is being read out or transmitted.

The foregoing and other objects and features of our invention may be more readily understood from the following description when read with reference to the attached drawing in which:

FIG. 1 shows the various component parts of an exemplary embodiment of our invention and the manner in which these component parts cooperate one with another and with elements of the prior art;

FIGS. 2 through 12 inclusive, show in detail the logic and control circuits of the exemplary embodiments of our invention;

FIG. 13 shows the manner in which FIGS. 2 through 12 inclusive are arrranged adjacent one another; and FIG. 14 shows the arrangement and information recorded in an exemplary converter register space within the circulating signal store or memory employed in the exemplarly embodiment of our invention set forth herein.

The specific embodiment of our invention disclosed herein and shown in FIG. 1 is more particularly adapted to telephone switching systems wherein a small number, such as four, converters and converter registers are required. While the specific embodiment disclosed herein assumes four such converters and converter registers, it is within the scope of our invention to provide as many additional converters and converter registers as may be required by the traffic conditions.

As shown in FIG. 1, a group of conductors 110 extend to a converter finder such as disclosed in the above-identified copending applications. The conductor desigated T, R and S conveys signals from the converter finder to the related control equipment, in accordance with the specific embodiment of our invention described herein. The conductors FT, FR and TC convey signals from the converter equipment in accordance with our invention to the converter finder and then to the switching system for operation of the switches thereof. The T, R and S conductors are connected to the control equipment 103 and also to a multifrequency receiver 101. From the multifrequency receiver the signals are conveyed through the converter gate No. 0, for example 113, to the common logic circuits 116. Likewise, signals are conveyed from the common logic to the control circuit 103 through the converter gate 0, designated 113, and then over the FT, FR and TC conductors to the switches of the telephone switching system.

A multifrequency receiver, such as 101, 106, 108, etc., is provided for each of the converters.

Common logic circuit 116, which operates at high speed and employs electronic devices, is provided for a plurality of the converters. In the exemplary embodiment described herein, provision is made for four converters to be controlled by the common logic circuit 116. The common logic circuit 116 is interconnected with the converter circuits by means of gate circuits such as 113 for the 0 converter, 114 for the No. 1 converter and 115 for the No. N converter.

In addition, a memory or storage device is employed in combination with the common logic circuit to store the received signals as they are received and then to record the number of signals and pulses transmitted. In addition the signals transmitted are of a different character from the received signals and may be received at an appreciably faster rate than is possible to transmit them so that it is necessary to store the received signals until they can be transmitted in the proper time sequence. A storage device 124, which in the exemplary embodiment described herein is a recirculating store, is therefore provided and controlled by the common logic circuits 116. This circulating storage memory device is provided with five channels designated herein A, B, C, D and E and F, the fifth channel being divided into two portions.

In the exemplary embodiment of our invention described herein, the signal store employs a diodeless magnetic shift register for each channel of the type disclosed in U.S. Patents 2,889,542 granted to R. B. Goldinger et al. on June 2, 1959; 2,963,591 granted to T.H. Crowley et al. on Dec. 6, 1960; and 3,145,370 and 3,145,371 granted to U. F. Gianola on Aug. 18, 1964.

A shift register of this type is employed for each bit of the word required to be stored and also an extra one of these shift registers for control purposes. Inasmuch as the exemplary embodiment described herein of our invention requires four bits in each stored word, a total of five such shift registers are provided in the signal store. Each of the shift registers in the exemplary embodiment described herein employs 16 slots designated 0 to 15. As pointed out herein the control equipment of the exemplary embodiment described herein is arranged for four such converters, thus requiring a total of four times 16 or 64 slots in each of the shift registers. The shift registers are advanced in parallel and cause a word to be read out from each slot as it reaches the end of the register. These words are then conveyed to the common logic circuits which cause them to be again stored or entered back into the store or modified and then read back into the store as required by the various logic circuits. Each complete cycle or circulation of the information once around the storage device is called herein a "pass."

Each of the shift registers requires two driving pulses to advance the stored information one slot. The first driving pulse is the PH1 pulse which pulse is employed to advance the stored information to a read-out position where the information is read out and entered upon various flip-flops and then operated upon by the logic circuits and various signal conditions. The second driving pulse PH5 is delivered to the signal store which advances the information to a writing in position where the same or altered information is read back into the store. Each of the five shift registers of the store is simultaneously advanced so that the signal information comprising a stored word and also the accompanying control information is advanced through the store in parallel.

As shown in FIG. 1, the output of the A channel 117 is connected to 11RAB reading amplifier and then transmitted to the logic circuits and then to the writing amplifier 11WAB where it is written in the B channel 118. Similarly, the output from the B channel is transmitted through the reading amplifier 11RAC then through the logic circuits and written in the C channel 119 by the 11WAC writing amplifier. The output from the C channel is transmitted through the reading amplifier 11RAD and then through the logic circuits 116 to the writing amplifier 11WAD and restored in the D channel. Also, the output from the D channel 120 is transmitted through the amplifier 11RAA and then through the logic circuits and then through the writing amplifier 11WAA and rerecorded in the A channel 117. Thus, on each cycle or each pass of the storage device the information in a given channel is rerecorded in the next adjacent channel. Since there are four channels, the information is recorded in the store in its original form every four passes of the information in or around the store. However, in order to reduce the amount of equipment and to improve the operation, the system is arranged so that a complete processing of the information through the storage and logic circuits requires 16 passes which passes are designated 0 through 15.

The fifth or control channel in the signal store is divided into two sections, one designated E and the other F. The E section is designated 121 and the F section 122 in the drawings.

The E section in the exemplary embodiment described herein is 14 bits or slots long, while the F section is 50 bits or slots long.

The output from the E section is transmitted through the 11RAF reading amplifier and then through the logic circuits to the 11WAF writing amplifier and then entered into the F section of the store. The output of the F section likewise transmitted through the 11RAE reading amplifier and then through the logic circuits and equipment and then transmitted to the 11WAE writing amplifier and entered in the E section of this fifth channel.

Inasmuch as the information in the store returns to its initial condition during the 0, 4, 8 and 12 passes, the information, as received from the multifrequency receiver, is entered in the store during these passes. The operation of the system during these and the other passes is shown in the following Table A:

TABLE A

| Passes: | System operations |
| --- | --- |
| 0, 4, 8, 12 | Receive digit; check for prefix; prepare for operator call. |
| 0, 1, 2, 3 | Increment digit at $\alpha$; send on 0 pass; increment IDT counter. |
| 4, 5, 6, 7 | Increment send digit counter; |
| 4 | Initialize IDT counter. |
| 5 | Examine separation of $\alpha$ and $\beta$. |
| 6 | Advance $\alpha$ to next slot. |
| 7 | Match digit counter; (0011). |
| 9 | Change "send" to "carry," IDT to "check," and "carry" to "clear"; compile digit counter setting; prepare next pass cycle. |
| 10 | Clear entire converter register; except synchronizing bit. |
| 11 | Initialize register. |

In the exemplary embodiment of this invention described herein four converters are provided and each converter is provided with a converter register space and a signal store comprising 16 slots, each capable of storing a four bit word, plus a control bit.

FIG. 14 illustrates one such converter register space and the information stored therein. As shown in FIG. 14 the first column represents the A channel which is employed to store the first or highest denominational order bit of the word. The second column represents the B channel which is employed for the next or $d2$ bit. The third column representing the C channel in the store which is employed to store the $d1$ bit while the fourth column representing the D channel which is employed to store the $d0$ or lowest denominational order bit of the stored word. The fifth column represents the fifth channel which is employed to store the control information accompanying each of the stored words.

As indicated in FIGS. 1 and 11, the fifth shift register or fifth column is divided into two shift registers for convenience in describing the operation of the system. The first 14 bits are designated E while the remaining 50 bits in this register are designated F. This shift register is divided into two parts to enable the output of the E shift register to be changed by the logic circuits and then entered into the F shift register in a manner described herein.

As indicated in FIG. 14 the first five slots 0 through 4 are employed for control purposes while the remaining slots in each register space are provided for storing the respective digits transmitted by a calling subscriber which are to be converted from multifrequency signals representing the digits to series of pulses suitable for operating step-by-step switches. The A, B and C channels of the 0, 1 and 2 slots are employed to enter coded information relative to the first three digits of the called number which information may then be readily decoded to indicate the number of digits expected in the call. A received code is entered in the first three slots for the D channel and an operations code entered in the first 3 slots of the E channel. The A, B, C, and D bits of the fourth or No. 3 slot are employed as a send digit counter while the A, B, C, and D bits in the No. 4 slot are employed as an interdigital counter to time the interdigital interval between the series pulses transmitted for operating the step-by-step switches.

A synchronizing bit is entered in the fourth or No. 3 slot of the E channel for control purposes as described herein. An $\alpha$ bit is initially entered in the No. 4 slot of the E channel and employed to control the transmission of digits. This information may be later moved to other succeeding slots in this channel.

Also initially a $\beta$ bit is entered in the No. 5 slot in the E channel and is employed to direct the equipment to enter the received digits in the corresponding slots as they are received. This bit likewise is moved successively to the other succeeding slots as the succeeding digits are received.

It is assumed that 0's will be recorded in all of the digit positions in each of the converter register spaces in the signal store including the receive code stored in the receive code positions. Also the operations code 100 will be stored in the slots 0, 1 and 2 respectively of the E channel. It is also assumed that initially the binary representation 1010 of the No. 10 is entered in the interdigital counter slot, No. 4 in channels A, B, C, and D.

Also a 1 representing $\alpha$ is stored in the fourth slot of the E channel and a 1 is stored in the fifth slot of the E channel representing $\beta$.

At the end of the shift registers these various signals are presented slot-by-slot and thus word-by-word to the read out amplifiers shown in FIG. 11. However, the outputs of the respective channels are shifted one channel, thus the output of the A channel is applied to the 11RAB amplifier which in turn is transmitted to control gates which are employed to control the 4B flip-flop. Similarly, the output of the B channel is employed to control the 5C flip-flops, the output of the C channel is employed to control the 5D flip-flops and the output of the D channel is employed to control the 4A flip-flops. Likewise the output of the E shift register is employed to control the 6F flip-flop while the output of the F shift register is employed to control the 6E flip-flop.

This information then may be altered by the logic circuit in the manner described herein and then in response to the succeeding 2PH5 pulse from the clock circuit, the setting of the respective flip-flops 4A through 6F is stored in the corresponding channels in the signal store. Then in response to the succeeding 2PH1 pulse the information recorded in the next slot is read out and processed by the logic circuits and then again entered in the beginning of the signal store.

The various receive codes are shown in the following Table A:

*Receive codes*

| | |
|---|---|
| 000 | Idle. |
| 100 | 1st digit received. |
| 110 | 2nd digit received. |
| 111 | 3rd or more digits received. |

The following Table B shows the

*Operation codes*

| | |
|---|---|
| 100 | Start. |
| 000 | Check. |
| 010 | Carry. |
| 011 | Send. |
| 110 | Clear. |
| 111 | Synchronize. |
| 001 | Interdigital timing. |

Four synchronizing bits, one in each of the converter register spaces and each comprising the bit in the No. 3 slot in the E channel, comprise a four bit number which is augmented by 1 during each pass. Such a four bit number is capable of assuming any one of 16 different states designated 0 through 15. On the first pass the number will be changed from 0 to 1, that is from 0000 to 0001. On each of the succeeding passes this number is augmented by 1 as described herein. Upon the 15th pass the number will be augmented by 1 and thus return to all 0's since no provision is made for storing the 1 carried into the fifth denominational order. At this time the setting of the clock circuit is checked against the number in these four bits to insure that the store has remained in synchronism with controlling clock circuits.

In the succeeding description the operation of the system in response to one of the converter register spaces, namely the No. 0 converter register space, will be described in detail. The system responds to each of the other converter register spaces in a similar or analogous manner to that described herein with reference to the 0 converter register space, in response to the signals received from the calling subscriber.

During the idle condition of a converter and corresponding converter register space the start code 100 is recorded in the operations code position in the converter register space.

The separation of the $\alpha$ and $\beta$ signals is checked during the No. 5 pass. So long as no signals are received the $\alpha$ and $\beta$ signals are in adjacent slots, namely the No. 4 and No. 5 slots in the E channel. So long as these signals remain adjacent to one another no further action or operation of the system takes place during the various passes except the incrementing of the number recorded in the four synchronizing spots or bits in the four converter register spaces.

Signals may be received from a calling subscriber at a maximum rate of not over twelve digits a second. The multifrequency receiver will maintain output signals for approximately 40–50 milliseconds independent of the length of time the subscriber maintains the key depressed. Thus, in accordance with the exemplary embodiment of our invention a complete cycle of 16 passes requires approximately a tenth of a second so provision has been made for recording the output of the multifrequency receiver during any one of the passes 0, 4, 8 or 12. Thus at any 25 millisecond interval the output of the multifrequency receiver may be recorded in the signal store.

Upon the receipt of each digit this digit will be recorded during the following Nos. 0, 4, 8 or 12 passes whichever one of these passes comes first following the receipt of the signals. In recording the first digit a prefix is recorded in the 0 slot and then the entire digit in binary form is recorded in the No. 5 slot.

The prefix for the second digit is recorded in the No. 1 slot and the binary representation of the digit recorded in the No. 6 slot. Similarly, the prefix for the No. 3 digit is recorded in the No. 2 slot and binary notation for this digit recorded in the No. 7 slot.

When the first three digits have all been recorded they are translated to determine whether they represent a revertive call. If a revertive call is indicated the converter control circuits are conditioned to properly respond to such a call.

During the No. 5 pass following the recording of any of the digits during the Nos. 0, 4, 8 or 12 passes, the α signal and the β signal will not be adjacent to one another. Consequently the "start" code will be changed to the "check" code in the operation code slots and during the following No. 6 pass the α signal will be advanced 1 slot and the "check" code changed to the "send" code.

Then during the following No. 9 pass the "send" code is changed to a "carry" code.

Thereafter during the succeeding 0 pass a pulse will be transmitted from the converter control circuits back to the step-by-step switches. In addition during this same 0 pass and the succeeding No. 1, No. 2 and No. 3 passes the binary representation of the first digit is increased by 1 in slot No. 5.

As described herein the binary representations of the digits recorded in the digit slots No. 5 through No. 15 is recorded in the form of the 16's complement of the binary representation of the received digit. Thus by increasing the representation of this digit the correct number of pulses will be transmitted when the representation is restored to all 0's. The binary number in a digit slot at any time thus represents the 16's complement of the number of pulses yet to be transmitted.

When the 1 has been completely added to the binary notation in the No. 5 slot for example during some one of the passes 0, 1, 2 or 3, the "carry" code is changed back to the "send" code. Then during the No. 9 pass this "send" code is again changed to a "carry" code so that during a next 0 pass another pulse will be transmitted.

In this fashion 1 pulse is transmitted during each 0 pass until all the pulses representing the first digit received from the calling subscriber have been transmitted to the step-by-step switches. Then during the same 0 and the succeeding 1, 2 and 3 passes, the binary representation of 1111 will be changed to 0000 in the corresponding digit slot and the "carry" code will not be changed to a "send" code. Instead during the following No. 4, No. 5, No. 6 and No. 7 passes, 1 is added to the send digit counter indicating that 1 digit has been completely transmitted to the step-by-step switches.

Upon the completion of the addition of 1 to the binary number stored in this send digit counter in slot 3 the "carry" code in the operations condition is changed to the interdigital timing code IDT. Then during the following No. 9 pass the IDT code is changed to the "check" code. During the succeeding 0, 1, 2 and 3 passes 1 is added to the number recorded in the IDT counter in slot No. 4.

Upon the completion of the additional 1 in this counter the "check" code is again changed to the IDT code.

Since a binary representation of the No. 10 is initially entered in the IDT counter slot No. 4, after six complete cycles, thus timing a six-tenths of a second interval, this counter will be restored to all 0's. The "check" code is not changed to the IDT code during any of the 0, 1, 2 or 3 passes.

At this time the equipment is ready to send the next digit and the step-by-step switches are ready to receive the next digit. Consequently, during the following No. 5 pass the relative positions of the α and β signals are again examined and if they are not adjacent the "check" code is not changed. If they are adjacent the "check" code is changed to the "start" code whereupon the system does not respond until additional digits are received. If another digit has been received or when another digit is received the above cycles of operation are repeated and the succeeding digits transmitted in a similar manner.

Upon the completion of the transmission of three digits and the adding of 1 to the send digit counter in slot 3, the number recorded in this counter will be found to be 3 during the seventh pass with the result that the IDT code is changed to the "check" code and then during the No. 9 pass the three prefix codes in slots 0, 1 and 2 are examined and translated and the send digit counter set in the binary representation of the 16's complement of the remaining digits to be transmitted for the call being processed. Then the IDT code is changed to a "carry" code after which the interdigital time interval is timed and then the succeeding digits transmitted in the manner described above.

Upon the completion of the transmission of all of the digits the send digit counter in slot 3 will be restored to 0 during the No. 4, No. 5, No. 6, and No. 7 passes but the "carry" code is not changed to an IDT code with the result that during the following No. 9 pass the "carry" code is changed to a "clear" code. Then during the No. 10 and No. 11 passes the converter register space is returned to its initial condition after which the converter is ready to respond to the next call in a similar manner.

The operation of this system will now be described in detail with reference to FIGS. 2 through 12 inclusive when arranged adjacent one another as shown in FIG. 13.

As shown in the drawings the various interconnecting conductors have been grouped together in cables designated 1, 2, 3, 4, 5, 6, 7, 8 and 9. The various conductors in these cables are individually identified at each place where they enter or leave the cable.

The flip-flops 4A, 4B, 5C, 5D, 6E and 6F are employed in combination with the respective channels A, B, C, D, E and F in the signal store first in reading out the information stored in these channels and then later to control the information stored or restored in the respective channels.

The flip-flops 7G and 7H are employed to cooperate with the synchronizing spots in the four converter register spaces and to record the passes for synchronizing purposes to be sure that the store stays in step with the control circuits.

The flip-flops 8J, 8K and 9L are employed to record the operations code from the operations code position in the store, that is the bits in the 0, 1 and 2 slots in the fifth channel in the store. These flip-flops are then in turn employed to control the operation of the logic circuits during the succeeding pass of the converter space.

The flip-flops 9X, 10Y and 10Z are employed in combination with the various And circuits to control the operation of the system in a manner described herein. When the exemplary system described herein embodying our invention is in operation but idle a multivibrator circuit 200 operates continuously and causes the various counter circuits or stages 2P0 through 2P8 and 3P9 through 3P12 to be stepped and in turn causes the store to be stepped during each cycle of the clock circuit.

During each pass the operations code is read out and entered upon the flip-flops 8J, 8K and 9L from the 0, 1 and 2 slots of the fifth channel of the store in the manner described herein. During the fourth pass, if the flip-flops 8K and 9L are set in the 0 states in response to either the reading out of the "start" code or a "check" code, then in response to the PH2 clock pulse following PH1 pulse, which causes the No. 4 slot to be read out and entered upon the flip-flops 4A, 4B, 5C and 5D, the flip-flops 4A and 5C will be set in their 1 states due to a positive output obtained from gate 4G46. When the "start" code or the "check" code are read out of this converter space during the No. 4 pass, the interdigital counter will have either 0000 recorded in it or 1010. In the first case, the setting will be changed to a binary representation of ten comprising 1010 or the setting will remain if this was the binary representation previously recorded in this slot, thus insuring that the proper number is entered in the interdigital timing counter storage space in the various converter registers in the signal store. Then in response to the following PH5 clock pulse this number will be read into the A, B, C and D channels of slot No. 4.

When the PH6 pulse is received from the clock circuit at the end of the processing of each slot in the store the flip-flops 4A, 4B, 5C, 5D, 6E and 6F are all restored to their 0 states. The other flip-flops remain in the conditions to which they were previously set at these times.

Then in response to the PH6 pulse received at the completion of processing of the No. 15 slot of each converter register space a positive output voltage is obtained from the And gate 8G82 which causes the flip-flops 8J, 8K, 9L, 9X, 10Y and 10Z to be reset to their 0 state. The flip-flops 7G and 7H are set and reset as described herein.

The above described resetting of the various flip-flops takes place as described but this description will not be repeated each time.

The exemplary system described herein embodying our invention is controlled by an oscillator or multivibrator circuit 200 which may operate at any suitable frequency such as 82 kilocycles. This multivibrator has two output voltages designated M and M'. When the multivibrator is in 1 state the positive voltage output is obtained on the M conductor while positive voltage output is obtained on the M' conductor when this multivibrator is in the opposite state. The M' output from this multivibrator is employed to drive a binary counter which is used to control the operation of the system.

The first three stages of this counter designated 2P0 through 2P2 form a clock circuit. The output from these three multivibrator stages control the output from gates 2G1 through 2G6. The output of gate 1 is designated 2PH1 while the output from the succeeding gates is correspondingly designated 2PH2 through 2PH6 respectively. Thus, the clock circuit has six phase output. Inasmuch as the M output from the multivibrator 200 is also transmitted to each of these gate circuits, a positive output pulse is obtained only during the time the multivibrator has a positive output voltage on the M lead. The positive output voltage on the M' lead is employed to drive the three bit binary counter so that the various stages of this counter are changed or shifted and the gates correspondingly controlled at this time and then at a later time an output is obtained from the corresponding gate circuits. The various output phases from this clock circuit are employed to further control the system as will be described. The outputs PH1 and PH5 are uniformly spaced from each other in time. The outputs PH2, PH3 and PH4 are uniformly spaced between the outputs PH1 and PH5, while the output from 2PH6 is phased to be just prior to the output of 2PH1 of a next cycle of the operation of the clock circuit.

The output from the first three stages of the binary counter is transmitted to the next four stages 2P3 through 2P6. These four stages of this counter have a possible 16 different states thus defining 16 different times, which times are employed to designate the different slots 0 to 15 in each of the converter register spaces in the store. The ouput of these counter stages are connected to the gates 2G14 through 2G23 and the outputs of these gates are designated 2S0, 2S1, 2S2, 2S3, 2S4, 2S5, 2S13, 2S14, 2S15 and 2S>3. These outputs are employed to designate the various slots in the storage system employed in our invention.

The next two stages of the binary counter 2P7 and 2P8 define four different time intervals and the output of these stages is applied to the gates 2G24 through 2G27. The outputs of these gates are designated 2C0 through 2C3 thus designating the four different converters of the exemplary embodiment of this invention described herein.

Figure 3:
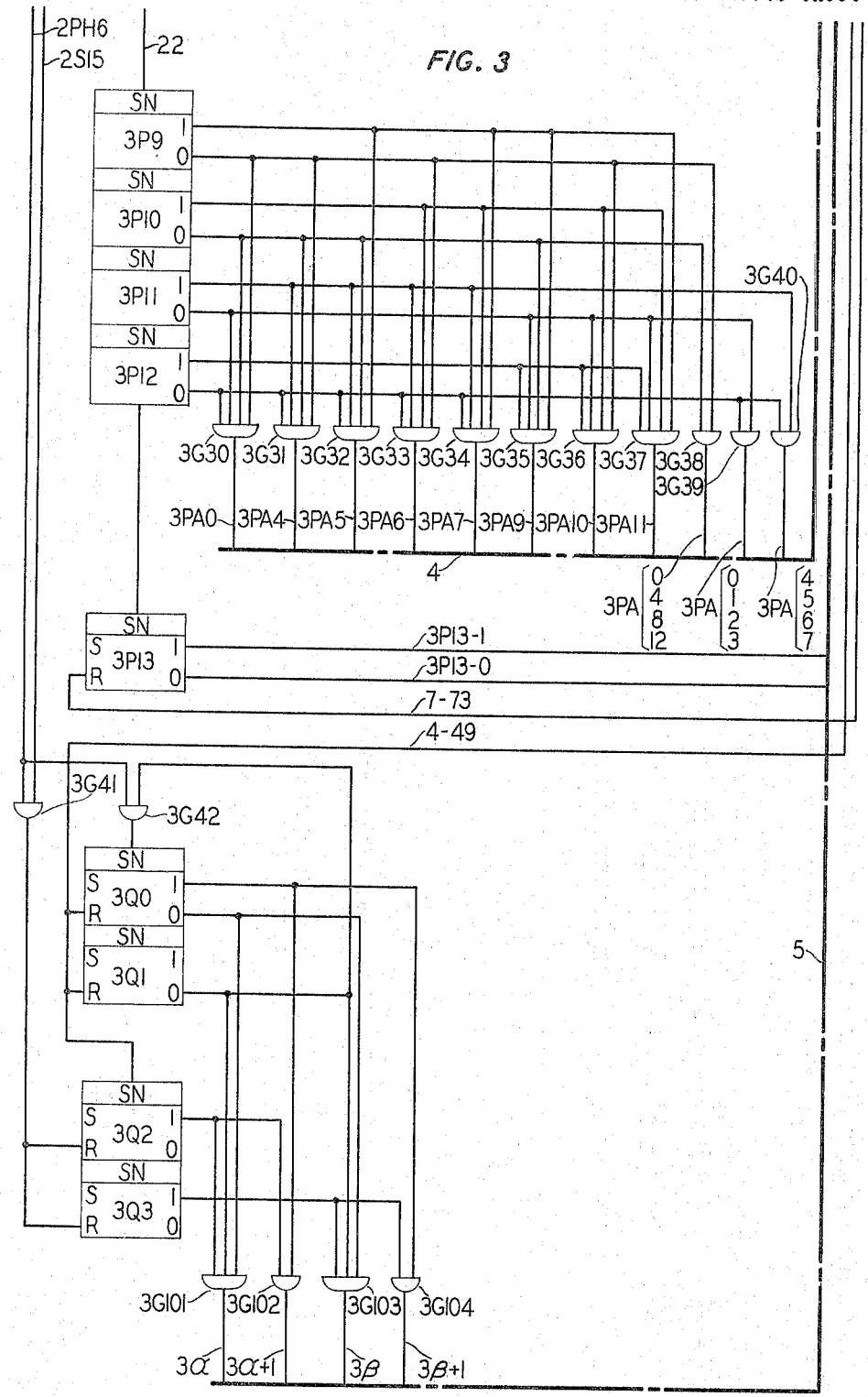
Figure 4:
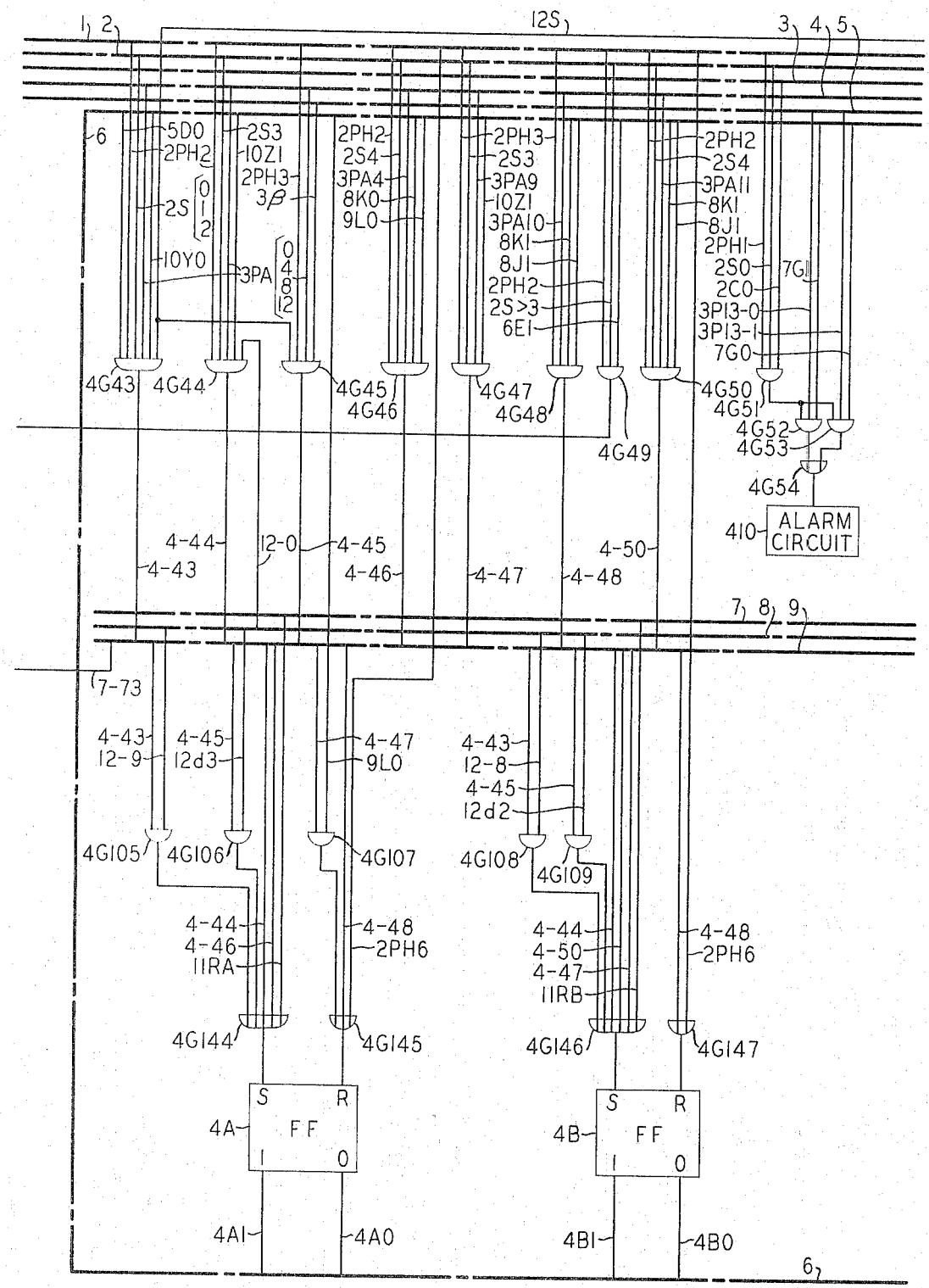
Figure 5:
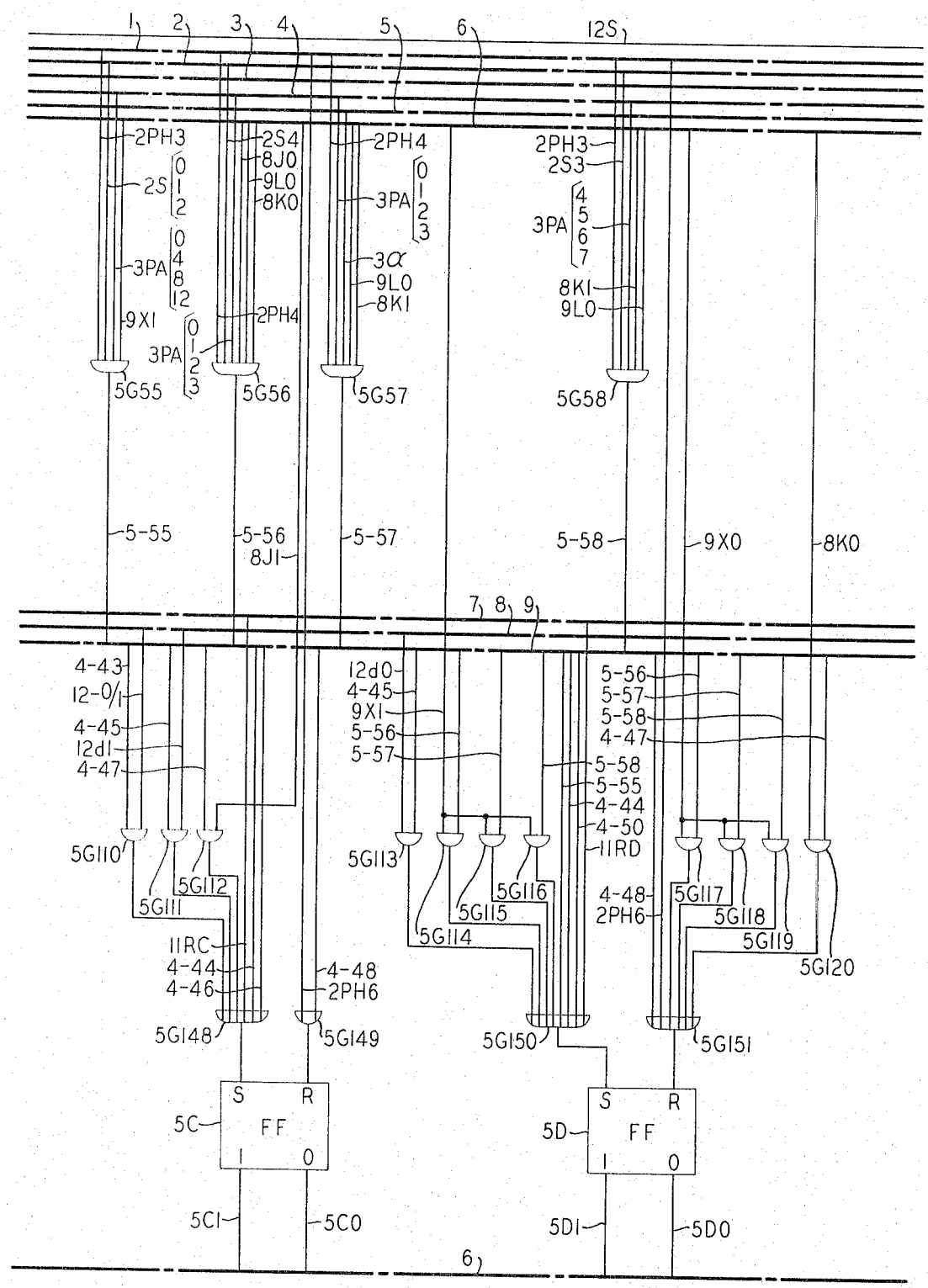
Figure 6:
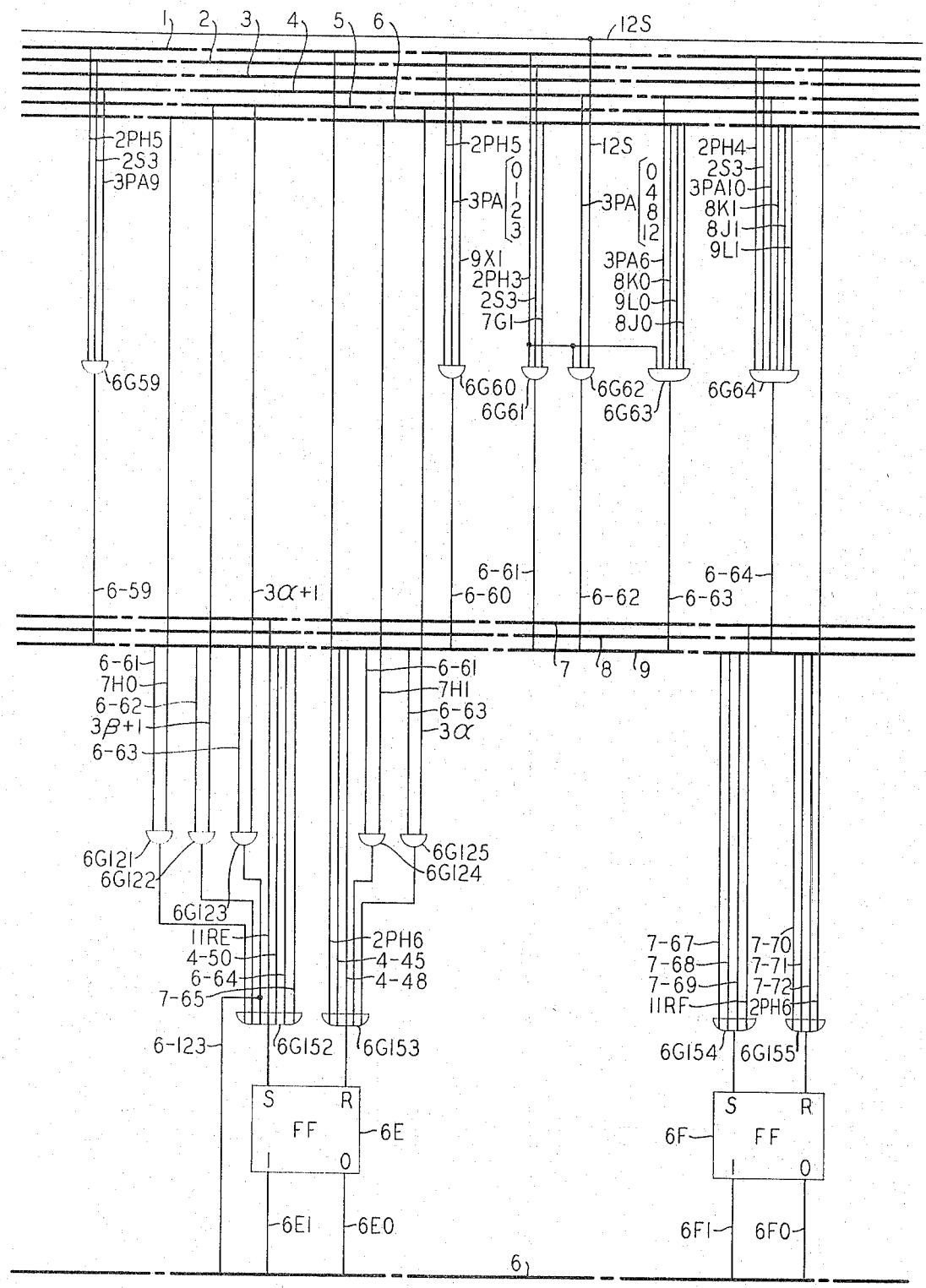
Figure 7:
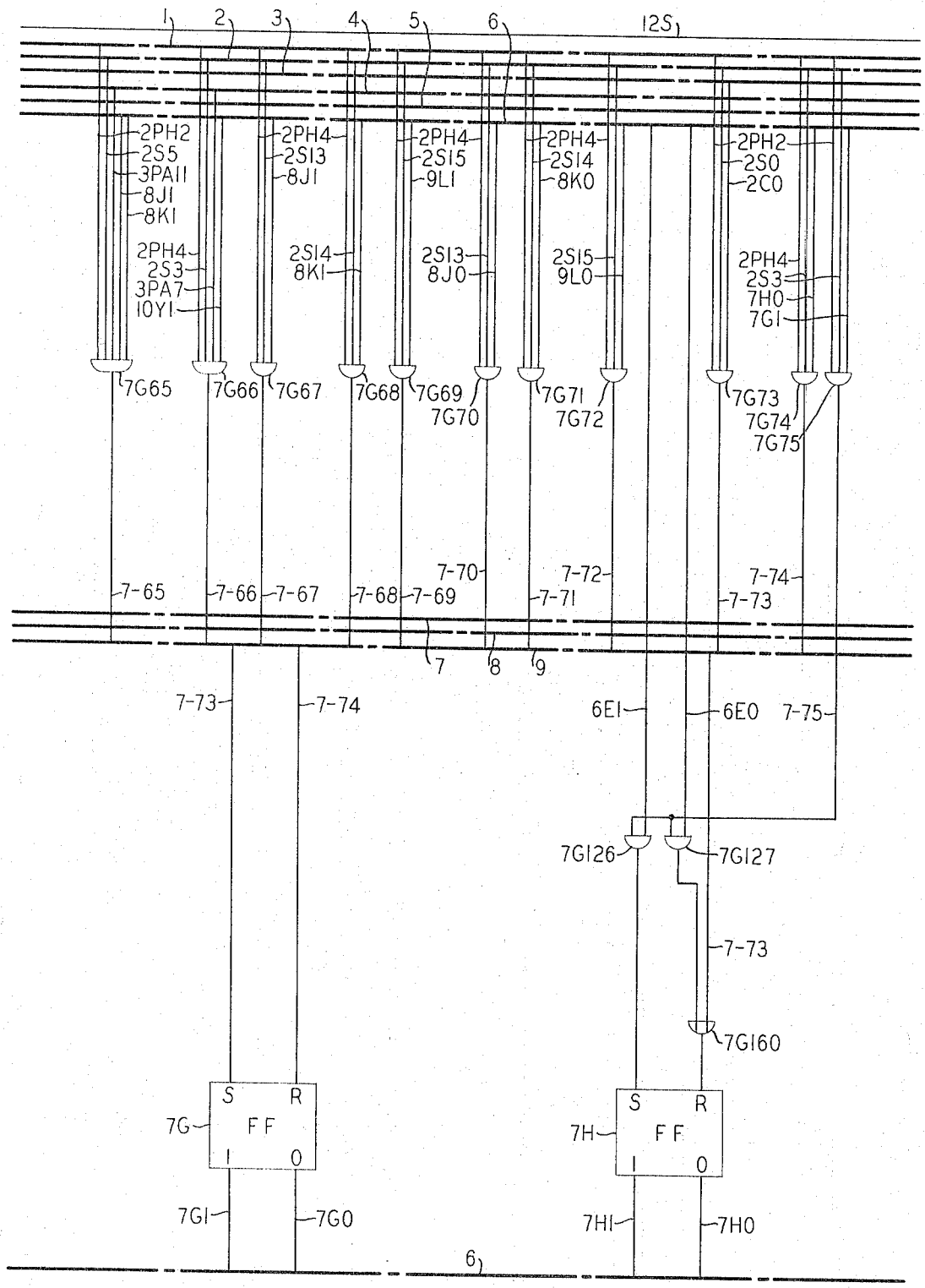
Figure 8:
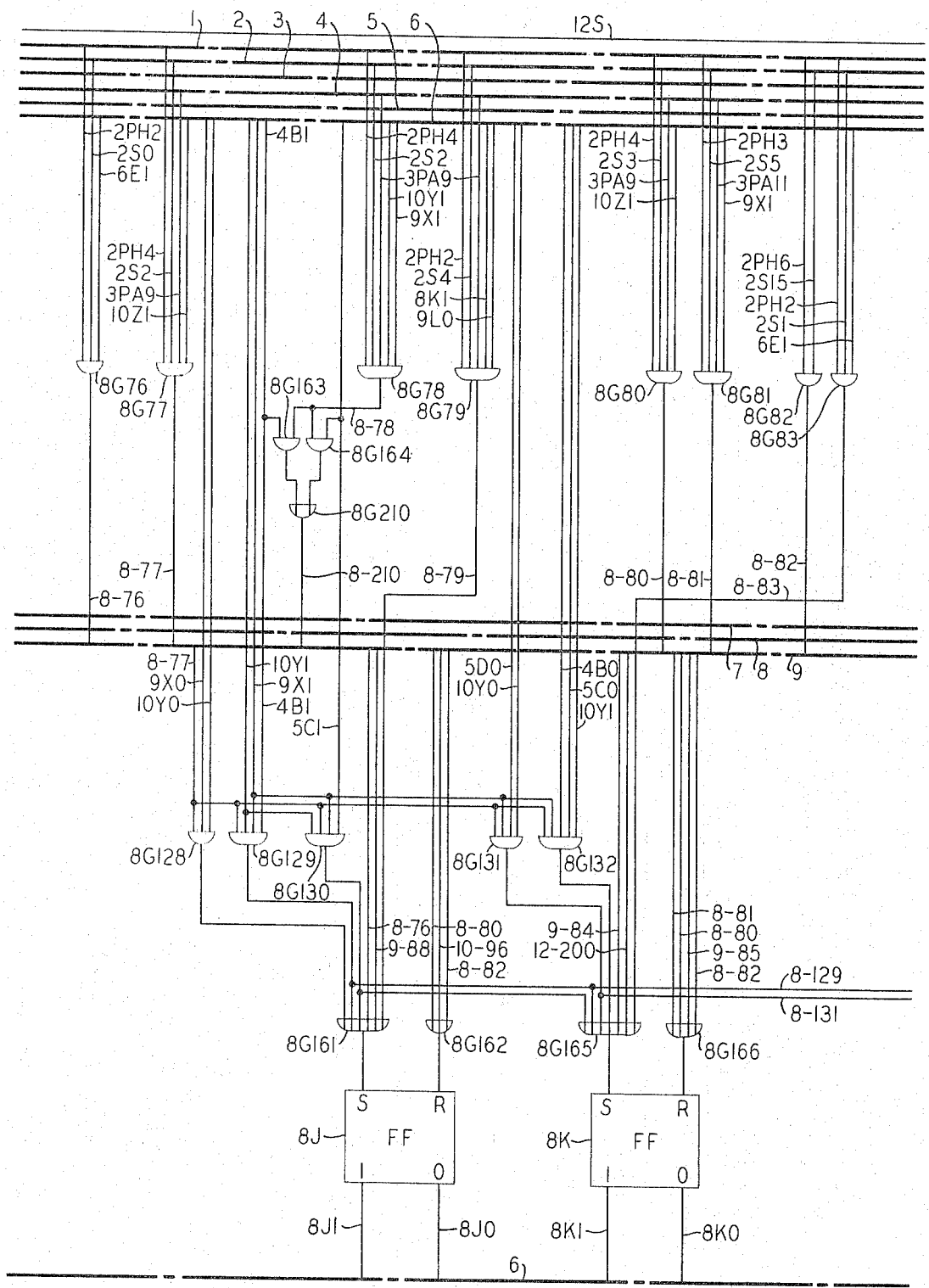
Figure 9:
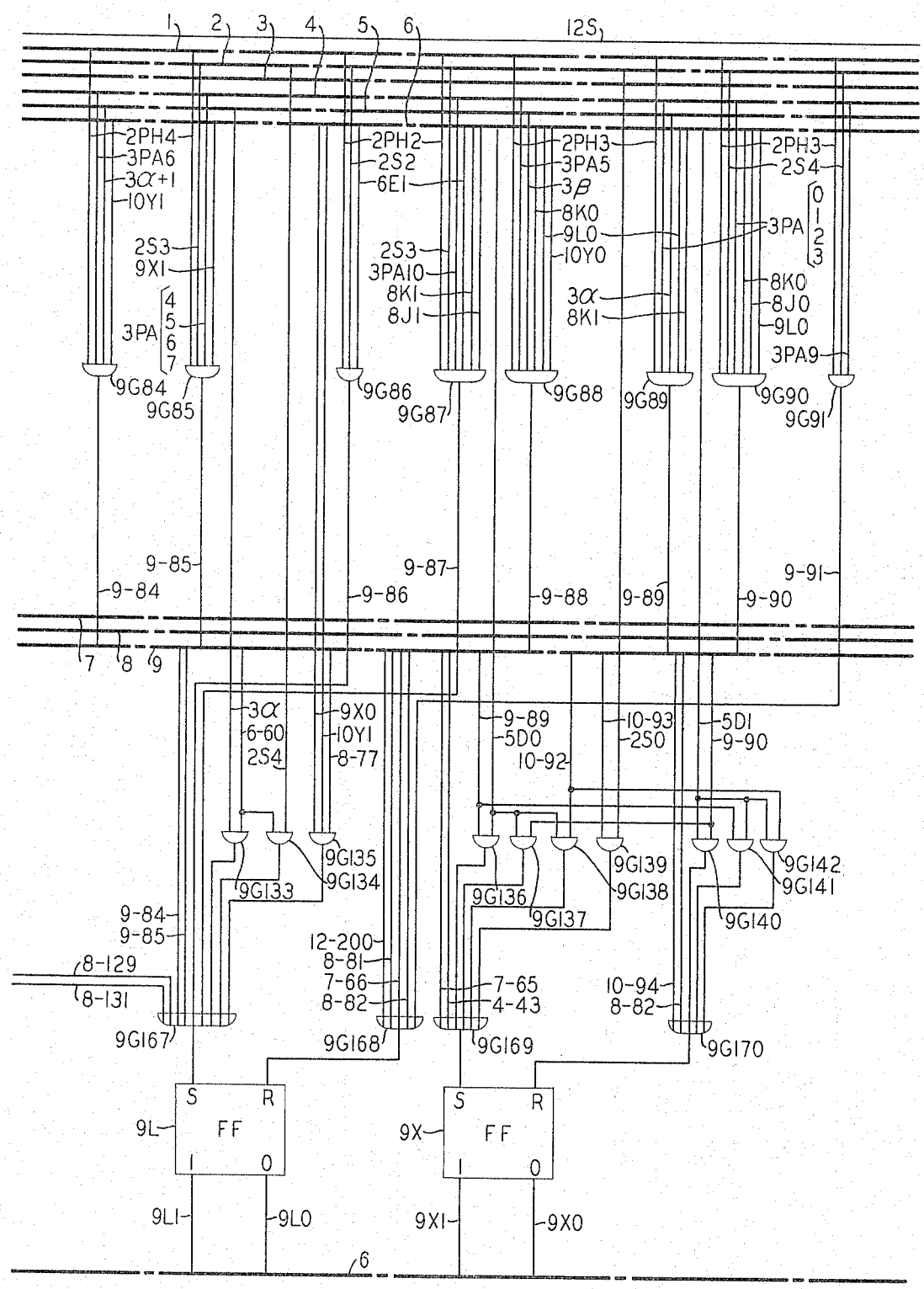
Figure 10:
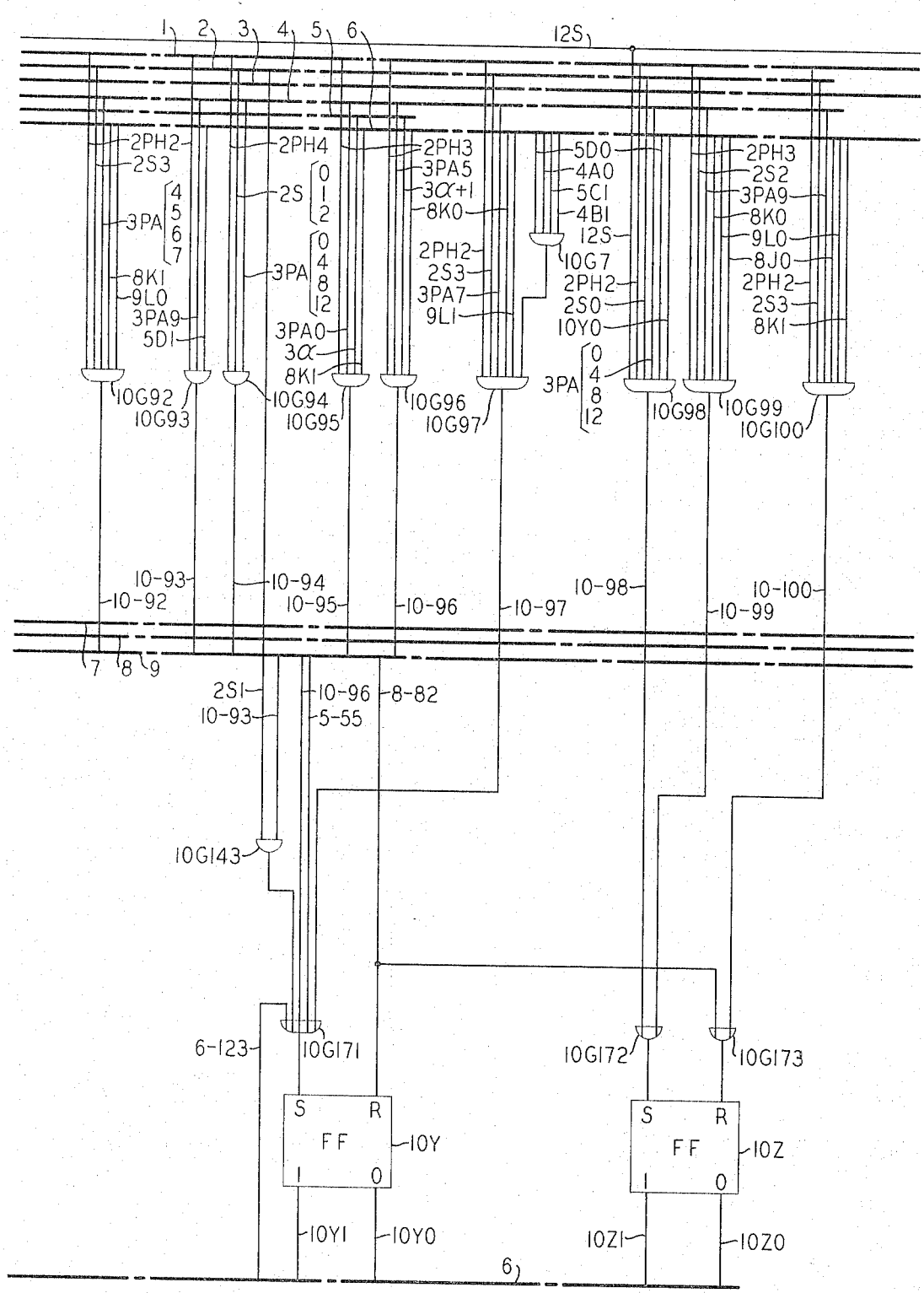

The output of the 2P8 binary counter stages is connected by conductor 22 to the input of a four stage binary counter shown in FIG. 3 comprising the binary counter stages 3P9 through 3P12 inclusive. Since there are four stages in this binary counter it has a total of 16 different states which are used to define or designate the 16 different passes of the signal store. The output of these stages is connected to a series of And gates 3G30 through 3G40 inclusive. These And gates have a positive output during the passes numbered 0, 4, 5, 6, 7, 9, 10, and 11 and also an output during the passes numbered 0, 4, 8, and 12, also during the passes numbered 0, 1, 2, and 4 and 4, 5, 6, and 7 of the store in the manner described below. The output of the last stage 3P12 of this binary counter also extends to a fourteenth binary counter stage 3P13 which is used to operate an alarm if the count of the slots, spaces and passes within the store becomes out of step with the corresponding count in the binary counter in a manner described herein.

Thus, the multivibrator 200 and each of the binary counter stages 2P0 through 2P2 of the clock circuit and the other binary counters, all of which may be considered a large binary counter, are continuously operating at all times during the time the equipment is in use independent of whether or not any signals are being received or transmitted by the equipment.

During each cycle of the three stage binary counter 2P0 through 2P2 the first phase pulse 2PH1 and the fifth phase pulse 2PH5 are employed to drive the signal store.

Assume now that the system has been put in operation and that the information recorded in each of the converter register spaces in the signal store is 0 except as pointed out above. At this time also assume that 0000 will be recorded in the respective synchronizing spots in each of the four converter register spaces. Assume also that all of the counter stages 2P0 through 2P8 and 3P9 through 3P12 and 3P13 are in their 0 states and that the first slot in the 0 converter register space is ready to be read out of the signal store of FIG. 11.

Figure 2:
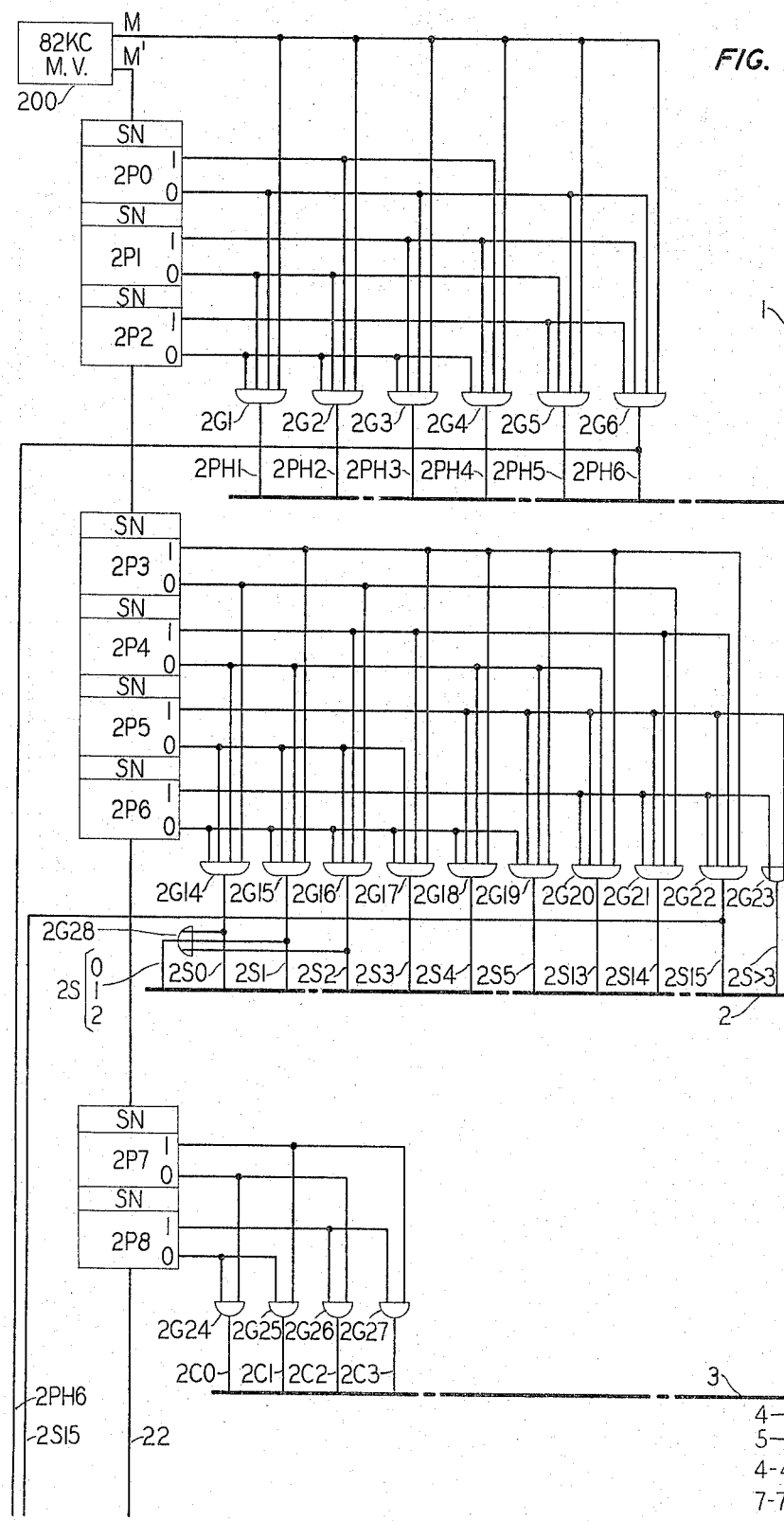

Then upon the next succeeding cycle of the multivibrator 200 an output voltage or current will be obtained from the 2G1 gate circuit and cause a pulse to be applied to the 2PH1 conductor extending to the signal store of FIG. 11 and cause the first slot to be read out. At this time the A digit will be read out of the D channel but applied to the 11RAA amplifier and then to the 11RA conductor extending to the Or circuit 4G144. As a result the 4A flip-flop will be set in its 1 state if a 1 is read out of the store in this channel at this time. Then this bit will be recorded in the A channel. Similarly, the B bit will be read out of the A channel and applied to the 11RAB amplifier and then to the 11RB conductor extending to the Or circuit 4G146 which controls the 4B flip-flop. This bit will then be written into the B channel at a later time. Similarly, the C bit will be read out of the B channel and applied to the 11RAC amplifier, the output of which extends over the conductor 11RC to the gate circuit 5G148 and later recorded in the C channel. In a similar manner the information for the D, E and F channels are read out and transmitted the corresponding Or circuits 5G150, 6G152 and 6G154 for controlling the respective flip-flops 5D, 6E and 6F. All 0's will be read out except the one recorded in the 0 slot of the E channel which will cause the flip-flop 6E to be set in its one state. In addition, since both the binary counter stage 3P13 and the flip-flop 7G are assumed to be in their 0 states at this time, no output will be obtained from the And circuits 4G52 or 4G53 and thus no output will be obtained from the Or circuit 4G54. Consequently, at this time, it is assumed that the binary counter stages shown in the controlling circuits in FIGS. 2 and 3 are in step with the binary number recorded in the synchronizing spots in the four converter register spaces; under the assumed conditions these spots will be 0. Thus, the alarm circuit 410 remains unactuated.

Then in response to the succeeding PH2 pulse applied to the 2PH2 conductor from the 2G2 And gate a positive output will be obtained from the And gate 7G73 because all of its inputs are positive at this time; one of these inputs extending over the 2S0 conductor from the 2G14 And gate designating the 0 slot; another input extending over the 2C0 conductor from the 2G24 And gate designating the 0 converter register space and the third input from the 2PH2 conductor. The output from this And gate is employed to set the 7G flip-flop in its 1 state. Inasmuch as the system is idle no further responses are obtained from the PH3 and PH4 clock pulses. In response to the PH5 clock pulse the setting of the flip-flops 4A, 4B, 5C, 5D, 6E and 6F is again read back into the signal store of the 0 slot of the 0 converter register space. Under the assumed conditions 0 will be entered in the 0 slot in all channels except the E channel where a 1 is restored. In response to the succeeding PH6 pulse the flip-flop 6E will be restored to its 0 state. If any of the other flip-flops 4A, 4B, 5C, 5D or 6F were in their 1 state it would also have been restored to its 0 state at this time. However, the flip-flop 7G remains in its 1 state.

In response to the succeeding PH1 pulse the information stored in the second slot will be read out and entered upon the flip-flops in a manner described above. These will be all 0's under the assumed conditions which in turn will be restored in the second slot. In response to the succeeding PH1 pulse, the information recorded in the No. 2 or third slot will be read out which information is again all 0's. This will be restored in the third slot of this 0 converter register space in response to the succeeding PH5 pulse.

In response to the succeeding PH1 pulse applied to the 2PH1 conductor the information recorded in the No. 3 slot will be read out and entered upon the corresponding flip-flops. At this time the information in the synchronizing bit in the No. 3 slot of the E channel will be entered upon the 6E flip-flop over the conductor 11RE which is transmitted through the Or circuit 6G152 to the set one input of the 6E flip-flop. Inasmuch as the system is idle it does not respond to the information read out from the A, B, C and D channels of the signal store at this time.

In response to the succeeding PH2 pulse, a positive output voltage or current will be obtained from the And gates 7G75 and 7G127; due to the positive voltage or current input on the 2PH2 conductor from the And gate 2G2; the positive voltage or current input on the 2S3 conductor from the And gate 2G17; and a positive voltage on the 7G1 conductor from the 1 output of the 7G flip-flop which is in its 1 state due to the operation of And gate 7G73 as described above. The output from the And gate 7G75 is applied to one of the inputs of And gate 7G127 and positive voltage from the 0 output of the 6E flip-flop over the 6E0 conductor is applied to the other input of this And gate at this time. Since a 0 was assumed to be recorded in the synchronizing spot of the first converter register space the 6E flip-flop will be in its 0 state at this time.

The output voltage from the 7G127 And gate is transmitted through the 7G160 Or gate to the reset input of the 7H flip-flop thus causing this flip-flop to remain in its 0 state. Then in response to the PH3 pulse applied to the 2PH3 conductor from the 2G3 And gate, a positive voltage output will be obtained from the And gates 6G61 and 6G121, since the flip-flop 7H is now in its 0 state as described above. The positive output from the And gate 6G121 is transmitted through the Or gate 6G152 to the set one input flip-flop 6E, thus setting this flip-flop in its 1 state.

Then in response to the next clock pulse PH4 from the And gate 2G4 a positive voltage or current output will be obtained from And gate 7G74 and applied to the reset input of the 7G flip-flop thus resetting this flip-flop to its 0 state.

In response to the succeeding clock pulse which will be PH5 pulse from the And gate 2G5 a 1 will be written in the synchronizing spot in the 0 converter in the E channel because the 6E flip-flop is now in its 1 state. Its 1 output will, therefore, be transmitted over the 6E1 conductor to the 11G12 Or gate and then through the 11WAE writing amplifier to the input of E channel of the signal store.

Then the following PH6 pulse transmitted over the 2PH6 conductor from the 2G6 And gate is employed to reset the 6E flip-flop to its 0 state. At this time the flip-flops 6E, 7G and 7H are all in their 0 states. In response to the succeeding clock pulses the information in the succeeding slots in the 0 converter register space are read out and then later written back into the signal store in the manner described herein. Inasmuch as it is assumed that the system is idle no further operations take place.

When the various slots of the No. 1 or second converter register space are read out, the system will not respond other than to cause this information to be read back into the store without change in the manner described. Likewise the operation in response to the succeeding two register spaces No. 2 and No. 3 in the signal store, assuming the system to be idle, will be the same as described with reference to the operation of the No. 1 converter register space. Thus at the end of the first pass, a 1 will be written in the synchronizing spot in the 0 converter register space while 0's will be recorded in the synchronizing spots of the other three register spaces, thus designating the first pass.

Likewise the binary counter stage 3P9 will be set in its 1 state due to pulses transmitted over the conductor 22 from the binary counter states 2P8. Thus the information recorded in the four synchronizing spots, one in each of the four converter register spaces, correspond with the setting of the binary counter stages 3P9 through 3P12 inclusive.

On each of the succeeding passes of the information stored in the signal store the count registered in the binary counter stages 3P9 through 3P12 will be advanced by 1 due to a pulse transmitted over the conductor 22 from the binary counter stage 2P8.

In causing the count recorded in the synchronizing spots to be correspondingly advanced, 1 must be added to the number recorded in these spots. In adding 1 to the numbers recorded on these four spots, one in each of the converter register spaces, the various spots are read out in succession and changed so long as a 1 is read out. When a 0 is read out it is also changed but the synchronizing spots in the succeeding register spaces are not changed. By thus starting with the least significant synchronizing spot in the 0 converter space a 1 may be readily added to the number recorded in these synchronizing spots so that the number recorded in these spots corresponds to the setting of the flip-flops 3P9 through 3P12.

When the 0 slot of the 0 converter space is again read out in response to the PH1 pulse no output will be obtained from gates 4G51, 4G52, 4G53 or 4G54 because the binary counter stage 3P13 is in its 0 state and the flip-flop 7G is also in its 0 state. Then in response to the succeeding PH2 pulse a positive voltage output will be obtained from the And gate 7G73 which is employed to set the flip-flop 7G in its 1 state. Thereafter the information previously read out of the 0 slot of the 0 converter space will be written back in the spot in the manner described herein and the information stored in the succeeding spots read out and written back in.

When the information is read out from the No. 3 slot in this 0 register space the flip-flop 6E will be set in its 1 state in response to the 1 read out of the synchronizing spot which was written in this spot during the first pass as described above.

With the flip-flop 6E set in its 1 state an output voltage will be obtained from And gates 7G75 and 7G126 in response to the succeeding PH2 pulse. The output from And gate 7G126 is employed to set the flip-flop 7H in its 1 state. At this time both the flip-flop 7G and 7H are in their 1 states. The flip-flop 7G is employed to cause the 1 to be added to the count in the synchronizing spots and the 7H flip-flop is employed to indicate a carry.

In response to the PH3 clock pulse an output voltage will be obtained from the And gates 6G61 and 6G124 since flip-flops 7G and 7H are both in their 1 states.

As a result the flip-flop 6E is reset to its 0 state. Since the flip-flops 7H is in its 1 state no output will be obtained from the And gate 7G74 in response to the succeeding PH4 pulse. However, in response to the succeeding PH5 pulse a 0 will be written back in the store in the synchronizing spot in the 0 converter register space.

Since the flip-flop 6E is now in its 0 state, it will remain in its 0 state in response to the PH6 clock pulse.

At this time the 1 previously written in the synchronizing spot in the 0 converter register space has been changed to a 0 and the flip-flops 7G and 7H are still set in their 1 states.

In response to the succeeding clock pulses the succeeding slots in the 0 register space are read out and then rewritten back in the register space in the manner described herein.

However, when the No. 3 slot in the No. 1 or second converter register space is read out in response to the PH1 clock pulse, flip-flop 6E will remain in its 0 state because it has been assumed that a 0 was recorded in this sychronizing spot in the No. 1 converter register space.

Then in response to the succeeding PH2 pulse a positive output will be obtained from And gate 7G75 and 7G127 since the flip-flop 6E is in its 0 state. As a result a positive voltage will be obtained from And gate 7G127 and transmitted through the Or gate 7G160 to reset the 7H flip-flop to its 0 state.

In response to the succeeding PH3 pulse, flip-flop 6E is set in its 1 state by the positive output from And gates 6G61 and 6G121 and Or gate 6G152 because flip-flop 7H is now set in its 0 state as described above.

Then in response to the succeeding PH4 pulse positive output will be obtained from the And gate 7G74 and cause the flip-flop 7G to be reset to its 0 state.

As a result, when the PH5 pulse is received from the clock circuit a 1 will be written in the second synchronizing spot because the flip-flop 6E is now set in its 1 state. Then in response to the PH6 pulse the flip-flop 6E is restored to its 0 state in a manner described above. At this time all the flip-flops 6E, 7G and 7H are in their 0 states.

The succeeding slots in the No. 1 register space will then be read out and later written back in this register space in the manner described herein. The slots in the succeeding register spaces will likewise be first read out and then rewritten back in the register spaces in the usual manner. In this case 0's will be read out from the synchronizing spots in these register spaces and since flip-flops 7G and 7H are both in their 0 state these 0's will not be changed.

Thus at the end of the second pass a binary number 0010 is recorded in the synchronizing spots in the respective converter register spaces in the signal store. Likewise the binary counter comprising the stages 3P9 through 3P12 has been advanced so that these stages are now set beginning with stage P12 in their 0010 state corresponding with the binary No. 2 which is the same as the binary number recorded in the synchronizing spots in the converter register spaces. On each of the succeeding passes the binary number recorded in the synchronizing spots will be incremented by 1 and the binary number set upon the binary counter stages 3P9 through 3P12 will likewise be incremented by 1. At the end of the 16 passes, i.e., at the end of the No. 15 pass, these binary counter stages will all be set in their 1 state and 1's will be recorded in each of the synchronizing spots in converter register spaces. In addition, the binary counter stage 3P13 will still be in its 0 state and the flip-flops 7G and 7H will have been reset to their 0 states. Consequently, no output will be obtained from either of the And circuits 4G52 or 4G53 so that alarm indication will not be given thus indicating that the binary counter stages 3P9 through 3P12 and the information recorded in the synchronizing spots in the converter register spaces are in step. At the end of the next or 17th pass the binary counter stages 3P9 through 3P12 will all be restored to their 0 state and the binary counter stage 3P13 will be set in its 1 state. At this time 0's will have been recorded in all of the synchronizing spots in the converter register spaces, but the flip-flops 7G and 7H remain in their 1 states. Consequently, no output is obtained from the And gate 4G52 or 4G53 at the beginning of the 18th pass. At this time an output is obtained from the And circuit 7G73 in a manner described above. Output from this And circuit causes the binary counter stage 3P13 to be reset into its 0 state so that the operation of the circuit will be substantially as described above during the succeeding passes. An alarm indication will only be given if at the end of 16 passes or any multiple thereof, the binary counter stage 3P13 and the flip-flop 7G are not set in the same condition, that is, both in their 0 states or both in their 1 states. So long as they are both in the same state no alarm is given because the count of the binary counter stages 3P9 through 3P12 corresponds with the count registered in the synchronizing spots in the converter register spaces.

The above described operation continues independently of whether or not signals are being received or transmitted. On each pass the binary counter stages 3P9 through 3P12 and the count in the synchronizing spots in the four converter register spaces is correspondingly changed. The counter is also checked after each 16 passes to be sure that the signal store is in step with the binary counter stages 2P0 through 2P8 and 3P9 through 3P12 as described above.

In addition to keeping a check on the synchronizing spots as described above on each pass the information recorded in the store channels A, B, C, D, E and F is read out and then restored back in the signal store in the manner described above for each and every one of the slots in this store. However, so long as no signals are received the circuits just repeat the above described cycles without change.

As shown in FIG. 1 a multifrequency receiver is provided for each of the converters. This receiver responds to the multifrequency calling signals transmitted by the calling subscriber which signals designate or represent the called subscriber's station or the called subscriber's directory number.

The multifrequency receiving units are arranged to cooperate with multifrequency transmitting equipment at various subscriber stations. Exemplary subscriber station circuits and equipment and multifrequency receiving equipment are shown in one or more of the following patents:

| Patent | Issued To | Issue Date |
|---|---|---|
| 2,147,710 | R. F. Mallina | 2/21/39 |
| 2,153,129 | H. M. Bascom | 4/4/39 |
| 2,228,113 | R. E. Hersey | 1/7/41 |
| 2,232,398 | A. A. Lundstrom | 2/18/41 |
| 2,237,742 | A. A. Lundstrom | 4/8/41 |
| 2,276,037 | A. A. Lundstrom | 3/10/42 |
| 2,315,344 | R. F. Mallina | 3/30/43 |
| 3,076,059 | L. A. Meacham-L. Schenker | 1/29/63 |

Similar equipment is also shown in Patent 3,109,071 granted to C. E. Mitchell et al. on October 29, 1963.

The above-described multifrequency circuits of FIG. 1 are similar to the corresponding circuits in the above-identified patents of F. C. Kuchas and G. Riddell and the copending application of Hanna-Kettley-Lowry and operate in a similar manner. These circuits are interconnected as shown in FIG. 1 with the converter gate circuit 113 which, in turn, is interconnected to common logic circuit 116; the common logic circuits are, in turn, interconnected with memory or store circuits, as described herein. When signals are received by the multifrequency receivers they cause various output leads to have potentials applied to them in accordance with the codes described in one or more of the above-identified patents and copending applications. In addition, a steer signal is applied to the steer lead STR by the multifrequency receiving equipment. This signal is then transmitted through a gate circuit such as 113 shown in FIGS. 1 and 12. As shown in FIG. 12 this signal is transmitted through the differentiating circuit 1210 and then through the Or gate circuit 12G206 to the monostable circuit 12M0. This circuit is thus actuated to its 1 state where it remains for a period of approximately 5 milliseconds after which it returns to its 0 state at which time the binary counter stage 12–S is actuated to its 1 state and causes a positive output voltage or current to be obtained from the And gate 12G204 because the other input of this And circuit has positive voltage or current applied to it over the 2C0 conductor due to the fact that 0 converter is being processed by the logic equipment and circuits. The positve output from the And gate 12G204 is then transmitted through the Or circuit 12G29 and then over the 12S conductor to the various And circuits as described herein.

The other outputs from the multifrequency receiver are transmitted through the respective gates 12G1 through 12G7 and then to the various Or circuits 12GL9, 12GL6, 12GL3, 12GL0, 12GH3, 12GH2, and 12GH1. From these Or circuits the output from the multifrequency receiver is transmitted through a plurality of translating gate circuits comprising the And circuits 12G181 through 12G190, inclusive, and the Or circuits 12G191 through 12G195, inclusive.

The And circuits 12G181 through 12G190 are interconnected with the outputs of the Or circuits from the multifrequency receivers so that an output will be obtained from the And gate 12G181 if the multifrequency code received represents the digit 1; an output will be obtained from the And circuit 12G182 if the received multifrequency code represents the digit 2. Outputs are obtained from the other of these And circuits in response to the multifrequency codes representing the last digit of the designation of the And circuits. Thus, an output is obtained from And gate 12G190 if the multifrequency code received represents the digit 0. The output from gate 12G190 is designated 12–0, the output from the gate 12G189 is designated 12–9 and the output from the And gate 12G188 is designated 12–8. Similarly, the output from the Or gate 12G191 is designated 12–0/1. An output is obtained on this conductor when the multifrequency code received by the multifrequency receiver represents either 1 or 0.

The interconnections between the And gates 12G181 through 12G190 and the Or gates 12G192 through 12G195, inclusive, are arranged so that the outputs from the Or gates represent in binary code form the 16's complement of the received digit. Thus, when the multifrequency code received represents the digit 0 an output pulse is obtained from the And circuit 12G190 and this output is transmitted through the Or gates 12G194 and 12G195 which causes an output to be obtained on the 12d1 and 12d2 conductors which is the binary representation of the 16's complement of the decimal digit 0 or 16. Similarly, if the multifrequency code received by the multifrequency receiver represents a digit 5 an output will be obtained from the And gate 12G185. This output is transmitted through the Or gates 12G192, 12G193 and 12G194 causing an output to be obtained of the 12d0, 12d3 and 12d1 conductors. Thus, this code is the binary representation of the No. 11 which is, in turn, the 16's complement of the 5 received by the multifrequency receiver.

As described herein, the logic circuits are arranged so that they will respond to the output of the multifrequency receiver during any one of the passes 0, 4, 8 or 12. Since it requires approximately 100 milliseconds for the system to progress through 16 passes, it will progress through one or another of these passes 0, 4, 8 or 12 every 25 milliseconds. Since the output is obtained from the multifrequency receiver for approximately 40–45 milliseconds none of the digits received by the multifrequency receiver will be lost. In addition, while the output from the multifrequency receiver is maintained for approximately 40–45 milliseconds, the outputs from two successive digits will be spaced by a minimum time interval of approximately 83 milliseconds since a multifrequency receiver such as 101 can not accept digits by the subscriber at any faster rate. Thus, when the system scans the 0 converter register space during some one of the passes 0, 4, 8 or 12 immediately following the application of potential to the 12S conductor in a manner described above, the system responds to record this digit in the signal store.

Assume for purposes of illustration that the system will scan this converter during the 0 pass immediately following the application of potential to the 12S conductor.

When the 0 slot of the 0 converter is scanned the 0's in the A, B, C and D channels, and the 1 in the E channel will be read out in response to the PH1 pulse from the clock circuit. As a result, the flip-flops 4A, 4B, 5C, 5D, and 6F will remain in their 0 state while flip-flop 6E will be operated to its 1 state.

Then in response to the following PH2 clock pulse with the 5D and 10Y flip-flops in their 0 states an output voltage will be obtained from the And gate 4G43. This output is transmitted over conductor 4–43 and through the Or circuit 9G169 to the set 1 input of the 9X flip-flop thus setting this flip-flop in its 1 state.

The output from the And gate 4G43 is also transmitted to the And gates 4G105, 4G108 and 5G110.

If the first digit received by the multifrequency receiver is a 9, then positive voltage will also be applied to the other input of the And gate 4G105 which, in turn, causes a voltage to be transmitted through the Or gate 4G144 thus setting the flip-flop 4A in its 1 state. If this digit is an 8 instead of a 9, then positive voltage will be applied to the second input of the And gate 4G108 causing a voltage transmitted to the Or circuit 4G146 to the set input of the flip-flop 4B. Similarly, if this first digit is a 0 or a 1, positive voltage will be transmitted to the second input of the And gate 5G110 and cause a voltage to be transmitted through the Or gate 5G148 to the set input of the flip-flop 5C.

In addition, an output voltage is also obtained from the And gate 10G98 and transmitted through the Or circuit 10G172 to the set input of the flip-flop 10Z thus setting this flip-flop in its 1 state.

Thus, in response to the PH2 clock pulse following the reading out of the 0 slot of the 0 converter register space in the signal store as assumed above, the flip-flop 9X is set in its 1 state. In addition, if the first digit is a 9 the flip-flop 4A is set in its 1 state. Alternatively, if the first digit is an 8 a flip-flop 4B will be set in its 1 state or if the first digit is a 1 or a 0 then the flip-flop 5C is set in its 1 state. In addition, if the digit is the first digit received from a subscriber the flip-flop 10Z is set in its 1 state.

Then in response to the succeeding PH3 pulse and with the 9X flip-flop set in its 1 state an output voltage is obtained from And gate 5G55 and transmitted over the conductor 5-55 and through the Or circuit 5G150 to the set input of the flip-flop 5D, thus setting this flip-flop in its 1 state.

The output voltage from the flip-flop 5G55 is also transmitted over conductor 5-55 and through the Or gate 10G171 to the set input of the 10Y flip-flop thus setting this flip-flop in its 1 state.

Then in response to the succeeding PH4 pulse an output voltage will be obtained from the And gate 10G94 which is transmitted over conductor 10-94 and through the Or gate 9G170 to the reset input of the 9X flip-flop and thus resetting this flip-flop to its 0 state.

At this time some one of the flip-flops 4A, 4B, or 5C may or may not be in their 1 state. Flip-flop 5D is in its 1 state and flip-flop 6E is still in its 1 state. Consequently, in response to the PH5 pulse, 1 will be written in the D channel and in the E channel of the 0 slot of the 0 converter register. In addition, a 1 will be written in the A, B or C channel if the first digit is a 9, an 8, or a 0, or 1. Then in response to the PH6 pulse the flip-flops 5D, 6E, and the flip-flops 4A, 4B or 5C, if any are in their 1 states, will all be restored to their 0 state. At this time the flip-flop 10Z is still in its 1 state. Next the number 1 slot will be read out which, under the assumed conditions, will be 0's and then these will be restored in this slot. Similarly, the third or No. 2 slot will then be read out and the 0's restored in this slot. It should be noted at this time that the 10Y flip-flop is in its 1 state, thus preventing an output voltage from being obtained from either of the And Gates 4G43 or 10G98.

Next, the No. 3 slot will be read out from the 0 converter register space. The No. 3 slot has the synchronizing bit recorded in the E channel and the circuits respond in respect to this bit in the manner described above. In addition, if the first digit dialed is 0 indicating a 0 operator call and the 10Z flip-flop is in its 1 state, an output will be obtained from the And gate 4G44 at this time, in response to the PH2 clock pulse following the reading out of the No. 3 slot.

The output from the And gate 4G44 is transmitted through the Or gates 4G144, 4G146, 5G148 and 5G150. As a result, the flip-flops 4A, 4B, 5C and 5D are all set to their 1 states in preparation for entering 1's in the send digit counter positions in channels A, B, C and D in slot 3 as indicated in FIG. 14. These 1's are the binary representations of the No. 15 which is the 16's complement of the decimal digit 1, thus indicating that only one digit is to be received, namely, the 0 for the operator's digit.

If the first digit is not a 0 then an output will not be obtained from the And circuit 4G44 so the flip-flops 4A, 4B, 5C and 5D will remain in their previous state or condition so that the setting or number read out of the No. 3 slot will be restored therein in response to the succeeding PH5 pulse.

Next the information previously stored in the No. 4 slot is read out and then restored in the store in a manner described above.

It will be recalled that a 1 is recorded in the E channel of slot 5 which 1 is called the β signal designating the place that the next received digit is to be stored in the slot reserved for storing the called digits. Since this is the first signal or digit received for the call the β will be in the No. 5 slot. As a result when this slot is read out the flip-flop 6E is set in its 1 state in response to the PH1 pulse. In response to the following PH2 pulse an output is obtained from the And circuit 4G49 which as described hereinafter sets the binary counter stage 3Q3 in its 1 state and this in turn enables And circuit 3G103 which causes a positive voltage to be applied to the 3β conductor. With a positive voltage applied to the 12S and 3β conductors an output is obtained from gate 4G45 in response to the succeeding PH3 pulse. The output voltage from the 4G45 And circuit is transmitted to the 4G106, the 4G109, the 5G111 and the 5G113 And circuits. The output of the gate circuits 12G193, 12G195, 12G194 and 12G192 is likewise transmitted to these respective And circuits. Thus, a conductor 12d0 extends to one of the inputs of the And circuit 5G113, the conductor 12d1 extends to one of the inputs of the And circuit 5G111, the conductor 12d2 extends to one of the inputs of the And circuit 4G109 and conductor 12d3 extends to one of the inputs of the And circuit 4G106. As a result the flip-flops 4A, 4B, 5C and 5D are set in accordance with the binary representation of the 16's complement of the first digit of the called number transmitted by the subscriber.

In addition the output of the And gate 4G45 is transmitted over conductor 4-45 and through the Or gates 6G153 to the reset input of the flip-flop 6E thus restoring this flip-flop to its 0 state.

Then in response to the succeeding PH5 pulse the member set on the flip-flops 4A, 4B, 5C and 5D is recorded or entered on the corresponding channels of the 0 converter register space in the signal store. In addition a 0 is recorded in the No. 5 slot of the E channel in place of the 1 previously recorded there.

Thereafter, the 0's recorded in the next or No. 6 slot will be read out and entered upon the corresponding flip-flops 4A, 4B, 5C, 5D and 6E in the manner described above. At this time there will be an output on conductor 3β+1 with a result that an output voltage will be obtained from the And gates 6G62 and 6G122 with the result that flip-flop 6E is set in its 1 state. Thereafter, in response to the PH5 pulse a 1 is entered in the E channel in the No. 6 slot.

Thus at this time the first digit has been received and a prefix controlled by the character of this digit entered into the A, B, and C channels of the 0 slot and the binary representation of the 16's complement of the number entered in the No. 5 slot which is the first digit slot which is idle.

The succeeding digits are entered in the store in substantially the same way and in response to the output voltages from the gates as described above.

However, since a 1 is recorded in the 0 slot of the D channel the prefix for the second digit will not be entered in the 0 slot; instead, the output from And gate 4G43 is not obtained until the No. 1 slot is read out at which time the prefix is entered in the A, B, and C channels in response to the character of the second digit, and a 1 is entered in the D channel of this slot indicating that the second digit has been received. The binary representation of the 16's complement of the second digit of the called number is then entered in the No. 6 slot and the 1 recorded in the E channel of this slot erased and moved out to the No. 7 slot in the E channel thus designating the position in the register space for entering the binary representation of the 16's complement of the next number transmitted by the calling subscriber.

The corresponding prefixes are entered in the No. 2 or third slot in response to the reception of the third calling signal transmitted by the calling subscriber. In addition a binary representation of the 16's complement of this number is entered in the proper slot in the converter register space in a manner described above, and the 1 in the E channel again advanced 1 step.

The succeeding digits of the called number transmitted by the calling subscriber are entered in the successive digit slots in the 0 converter register space in a manner similar to that described above.

As assumed above, a 1 was initially recorded in the No. 4 slot of the E channel and a 1 recorded in the No. 5 slot of the E channel. The 1 in the 4 slot in the E channel has been designated an $\alpha$ signal and is employed to designate or indicate the particular digit being transmitted. The 1 originally stored in the No. 5 slot in the E channel has been designated a $\beta$ signal and is employed to designate the location at which the next received digit is to be stored in the digit slots in the converter register space. Each time a digit is stored in such register space then the $\beta$ signal or 1 is advanced to the next slot in the manner described above. In addition, initially the $\alpha$ and $\beta$ signals were in adjacent slots. However, when the first digit is received the $\beta$ signal is advanced 1 slot so that now these two signals are separated. This is employed as an indication that it is desirable to start sending the digit which has already been received.

In order to control the operations of the system in accordance with the relative locations of these two signals, the binary counter stages 3Q0, 3Q1, 3Q2, and 3Q3 are employed. Assume first that the binary counter stage 3Q0 is in its 1 state and that the other binary counter stages 3Q1, 3Q2 and 3Q3 are all in their 0 states.

From FIG. 14 it is apparent that the $\alpha$ and $\beta$ signals may be stored in any of the slots numbered 4 through 15. When these slots are read out either or both of the binary counter stages 2P5 and 2P6 are in their 1 states, so a positive output voltage will be obtained from the Or gate 2G23 and transmitted over the conductor $2S>3$ to the And gate 4G49.

As described herein, each time the various slots are read out the information recorded in the E channel will be entered upon the 6E flip-flop. Thus for all the slots having a number higher than three each time either the 1 representing the $\alpha$ or the 1 representing the $\beta$ signal is read out and entered upon the E flip-flop an output will be obtained from the And gate 4G49. On each pass the $\alpha$ signal will cause the first positive output to be obtained from the And gate 4G49. This output voltage is transmitted over the conductor 4–49 to the set 0 inputs of the binary counter stages 3Q0 and 3Q1 and to the advance input of the binary counter stage 3Q2. As a result the binary counter stages 3Q0 and 3Q1 are restored to their 0 state while the binary counter stage 3Q2 is set in its 1 state.

With the binary counter stages 3Q0 and 3Q1 in their 0 state and the binary counter stage 3Q2 in its 1 state a positive output voltage will be obtained from the And gate 3G101 which output voltage is in turn transmitted over the 3$\alpha$ conductor to the various And gates as described herein. The output from the And gate 4G49 is in response to the PH2 pulse and in response to the succeeding PH6 pulse with the binary counter stage 3Q1 in its 0 state. As described above, an output will be obtained from the And gate 3G42 which causes the binary counter stage 3Q0 to be set in its 1 state.

With the binary counter stages 3Q0 and 3Q2 now both set in their 1 states an output is no longer obtained from the And gate 3G101. Instead an output is obtained from the And gate 3G102 which output voltage is transmitted over the 3$\alpha$+1 conductor to the various And gate circuits as described herein. The following PH6 pulse causes a positive output pulse from And gate 3G42 to reset the binary counter stage 3Q0 to its 0 state and set the binary counter stage 3Q1 to its 1 state so a positive pulse is no longer obtained from either of the And gates 3G101 or 3G102.

If the $\beta$ signal is in the next slot adjacent to the $\alpha$ signal this signal will be read out in response to the immediately succeeding PH1 signal and in response to the following PH2 signal another positive output voltage will be obtained from the And gate 4G49 which causes the binary counter stage 3Q0 to be restored to its 0 state and the binary counter stage 3Q1 to be maintained in its 0 state. In addition the binary counter stage 3Q2 is also restored to its 0 state while the binary counter stage 3Q3 is advanced to its 1 state. As a result, the positive voltage is removed from the 3$\alpha$+1 conductor and a positive output voltage is obtained from the And gate 3G103 and transmitted over the 3$\beta$ conductor to the various And circuits as described herein.

If the $\beta$ signal is not in the next slot adjacent to the $\alpha$ signal, a positive output voltage will be obtained from the And circuit 4G49 when this signal is read out of the store and the binary stage 3Q1 reset instead of 3Q0. Except for this difference the system responds to this $\beta$ signal as described above. In response to the following PH6 pulse an output will again be obtained from the And gate 3G42 and the binary counter stage 3Q0 again advanced from its 0 state to its 1 state. As a result, positive voltage is removed from the 3$\beta$ conductor and a positive output voltage obtained from the And gate 3G104 with a positive voltage being transmitted over the 3$\beta$+1 conductor.

After the next slot is read out, an additional PH6 pulse will be received and cause an output to be obtained from the And gate 3G42 with a result that the binary counter stage 3Q0 is restored to its 0 state and the binary counter stage 3Q1 set in its 1 state. These binary counter stages then remain in the above described states in which the binary counter stage 3Q0 is in its 0 state and binary counter stage 3Q1 is in its 1 stage, 3Q2 is in its 0 state and 3Q3 in its 1 state during the remaining portion of the pass.

When the No. 15 slot is read out, positive voltage will be obtained on the S15 conductor which is transmitted to the 3G41 And circuit. Then in response to the PH6 pulse received at the end of the cycle in which the No. 15 slot is read out, a positive output will be obtained from the And gate 3G41 and transmitted to the reset inputs of the binary counter stages 3Q2 through 3Q3 thus restoring these stages to their 0 state. Thus these binary counter stages have been restored to the initial assumed condition wherein the stages 3Q0, 3Q2 and 3Q3 are in their 0 states and the stage 3Q1 is in its 1 state. Thereafter during each of the succeeding passes these binary counter stages operate in the above described manner and cause a positive voltage to be applied to the 3$\alpha$ conductor in response to the PH2 clock pulse of the clock cycle in which the $\alpha$ signal is read out of the E channel of the signal store.

If the $\beta$ spot is not immediately adjacent the $\alpha$ spot, then during the next cycle of the clock circuit a positive output voltage is obtained on the 3$\alpha$+1 conductor. If the $\beta$ spot or signal is immediately adjacent the $\alpha$ signal then no output voltage will be obtained on the 3$\alpha$+1 conductor during a clock cycle but instead an output voltage is obtained on the 3$\beta$ conductor. Independent of the relative locations of the $\alpha$ and $\beta$ signals in the signal store an output voltage will be obtained on the 3$\beta$ conductor during the clock cycle during which the slot in which the $\beta$ signal is recorded is read out. During the time the next succeeding slot is read out an output voltage is obtained on the 3$\beta$+1 conductor.

During the No. 5 pass following the recording the first or any other digit and the advancing of the $\beta$ signal during any one of the Nos. 0, 4, 8 or 12 passes, as described above, the relative positions of the $\alpha$ and $\beta$ signals are checked. At this time they will be separated by one slot so the "start" code will be changed to the "check" code.

Thus, during the fifth pass following the entering of the first dialed digit in the converter register space in the signal store in the manner described above, an output will be obtained from the And gate 10G96 with the flip-flop 8K in its 0 state, and with a potential applied to the $3\alpha+1$ conductor, and in response to the PH3 clock pulse.

Under the assumed conditions, a positive voltage will be applied to the $3\beta+1$ conductor in response to the PH6 clock pulse and during the time the No. 4 slot is read out and rerecorded in the signal store. Under the assumed conditions with $\alpha$ recorded in the E channel of the No. 4 slot and $\beta$ recorded in the No. 6 slot of the E channel positive voltage will remain on the $3\alpha+1$ conductor until the PH6 pulse is received from the clock circuit during the processing of the No. 5 slot.

Thus, in response to the PH3 pulse from the clock circuit during the time the No. 5 slot is being processed by the logic circuits, a positive output will be obtained from the And gate 10G96. This output is transmitted to the set input of the 10Y flip-flop through the Or gate 10G171 and to the reset input of the 8J flip-flop through the Or gate 8G162 thus setting the 10Y flip-flop in its 1 state and the 8J flip-flop in its 0 state. Then during the time the No. 13 slot of this register space is being processed by the logic circuits, a positive output will be obtained from the And gate 7G70 in response to the PH4 pulse. This positive output is transmitted to the Or gate 6G155 to the reset input of the flip-flop 6F.

As described above, the E portion of the fifth channel of the signal store is 14 bits or slots long and the remaining portion of this channel is designated F. Thus, when the thirteenth slot of a register space is being read out of the F portion, processed by the logic circuits and re-entered in the E portion of this channel, the No. 0 slot will be read out of the E portion and processed by the logic circuits to be re-entered in the F portion of this channel. Thus, at this time the 1 recorded in the 0 slot of the E channel will be read out and entered upon the 6F flip-flop. Then in response to the PH4 clock pulse and with the 8J flip-flop in its 0 state, a positive output voltage is obtained from the 7G70 And gate. This output is employed to reset the F flip-flop. Then in response to the following PH5 pulse the 0 will be entered in the 0 slot in the fifth channel thus changing the operations code from a "start" code of 100 to the "check" code of 000. The other two portions of this operations code remaining unchanged at this time.

During the next succeeding pass No. 6 the $\alpha$ is read out of the E channel from slot No. 4, and with the flip-flops 8J, 8K and 9L all set in their 0 states in response to the "check" code, an output is obtained from the And gates 6G63 and 6G125 in response to the PH3 pulse. The output of the And gate 6G125 is transmitted through the Or gate 6G153, thus causing the flip-flop 6E to be restored to its 0 state. As a result in response to the PH5 clock pulse, a 0 will be written in the E channel of the No. 4 slot, thus in effect erasing the 1 representing the $\alpha$ signal in this slot.

Then in response to the $3\alpha+1$ signal generated by the binary counter stages 3Q0 through 3Q3, as described herein, a positive output voltage will be obtained from the And gates 6G63 and 6G123 in response to the PH3 pulse generated during the time the No. 5 slot is read out and being processed by the logic circuit, since the flip-flops 8J, 8K and 9L are still all in their 0 states.

The output from the And gate 6G123 is transmitted through the Or circuit 6G152 and 10G171 to cause the flip-flops 6E and 10Y to be set in their 1 states. As a result, in response to the succeeding PH5 pulse, a 1 will be entered in the E or No. 5 channel and No. 5 slot therein. As a result of the operation of this system, in response to the No. 4 and No. 5 slots of the E channel during this pass, the $\alpha$ signal has been in effect moved from the No. 4 slot to the No. 5 slot, thus designating the No. 5 slot as the position of the digit to be transmitted by the equipment.

With the flip-flop 10Y set in its 1 state in response to the PH3 pulse, as described above, an output is obtained from the AND gate 9G84 in response to the succeeding PH4 pulse. The output of And gate 9G84 is transmitted through the Or gates 8G165 and 9G167 to the set 1 inputs of the flip-flops 8K and 9L, thus setting these flip-flops in their 1 states.

Later, when the No. 14 slot is read out and entered upon the flip-flops 4A, 4B, 5C and 5D and the No. 14 slot read out from the E channel and entered upon the 6E flip-flop, the No. 2 slot of the fifth channel will be read out and entered upon the 6F flip-flop. Then in response to the PH4 clock pulse an output will be obtained from the And gate 7G68 which causes the 6F flip-flop to be set in its 1 state. Then in response to the next PH5 pulse, a 1 will be written in the second slot in the fifth channel of the signal store. Similarly, during the processing of the No. 15 slot, a 1 is written in the third slot of the fifth channel, thus changing the operations code from a "check" code to a "send" code.

During the time the fourth slot is being processed by the logic circuits during the ninth pass, and in response to the PH3 clock pulse, a positive output is obtained from the And gate 9G91 which output voltage is transmitted from the Or circuit 9G168 to the reset input of the 9L flip-flop, thus restoring this flip-flop to its 0 state.

Then during the time the No. 15 slot of this 0 converter register space is being processed by the logic circuits, a positive output voltage will be obtained from And gate 7G72 which output voltage is transmitted through the Or gate 6G155 and causes the flip-flop 6F to be reset to its 0 state. Then in response to the following PH5 pulse, the 0 will be written back in this spot of the F register which is in the No. 2 slot in the fifth channel in the register. As a result, the operations code is changed from a "send" code of 011 to the "carry" code of 010.

Then during the succeeding 0 pass a positive output voltage will be obtained from the And gate 10G95 when the $\alpha$ slot is read out from the No. 5 slot in the fifth channel in the signal store and in response to the succeeding PH3 pulse. At this time the flip-flop 8K is in its 1 state due to the carry code as described above.

The output from the And gate 10G95 is transmitted to the And gate 12G203. Positive voltage is also applied to the other input of this And gate from the 2C0 conductor at this time with the result that a positive output voltage is obtained from this And gate and employed to set the monostable circuit 12M1 to its 1 state.

As a result a positive output is sent to the signal converter control circuit at this time which in turn causes a pulse to be transmitted over the FT and FR leads to the step-by-step system for actuating the first selector one step. The monostable circuit M1 will remain in its 1 state for a length of time required by the step-by-step switches to take a step, thereafter this circuit will return to its 0 state thus terminating the pulse to the step-by-step switches.

It is to be noted that the pulse from the 12M1 flip-flop circuit is a positive voltage on a 1 output of this circuit whereas the pulse usually required to operate step-by-step switches is an open circuit pulse. The pulse from the 1 output of this 12M1 monostable circuit thus is employed to operate a pulsing relay which pulsing relay in turn opens the circuit to the step-by-step switches in a well understood manner. When necessary the positive pulse from circuit 12M1 may be employed directly or otherwise changed to the proper kind of a pulse to operate the switching system.

In addition to sending a pulse to the step-by-step switches at this time it is desired to increment the number recorded in the digit slot at the $\alpha$ position. By adding 1 to this number the number of pulses required to be transnitted will be reduced by 1 since the number entered in his slot is the 16's complement of the number of pulses to be transmitted. This 1 is added during the 0 pass during which the pulse is transmitted and the following 1, 2, and No. 3 passes.

Thus in response to reading out of the α signal and the PH3 pulse an output is obtained from And gate 9G89 and either And gate 9G136 or 9G141 depending whether or not the 5D flip-flop is in its 0 state or in its 1 state. This flip-flop was previously set either in its 0 state or its 1 state in accordance with the information recorded in the fifth slot in the D channel in the signal store. If this flip-flop is in its 0 state then an output is obtained from the And gate 9G136 and transmitted through the Or gate 9G169 to the set input of the 9X flip-flop, thus setting this flip-flop in its 1 state.

On the other hand if the 5D flip-flop is in its 1 state then an output will be obtained from the And gate 9G141 and transmitted through the Or circuit 9G170 to the reset input of the flip-flop 9X thus restoring or maintaining this flip-flop in its 0 state.

Assume first that a 1 has been read out of the D channel for the No. 5 slot and entered upon the 5D flip-flop thus causing an output to be obtained from the 9G141 And gate which causes the 9X flip-flop to be reset or maintained in its 0 state.

In response to the succeeding PH4 pulse an output will be obtained from the And gates 5G57 and 5G118. The output from the And gate 5G118 is transmitted through the Or gate 5G151 to the reset input of the flip-flop 5D thus restoring this flip-flop to its 0 state. As a result, a 0 will be entered in this No. 5 slot in the D channel in response to the following PH5 clock pulse, thus changing the 1 previously recorded therein to a 0. The carry indication or code set on the 8J, 8K and 9L flip-flops is not changed so that this carry information will not be changed when the 13th, 14th and 15th slots are read out as described herein.

The succeeding registers respond to this pass in the same manner as the 0 register described herein depending upon the state of the stored information in these other register spaces. On the succeeding No. 1 pass of the 0 converter register space, the information previously stored in the C channel will now be stored in the D channel so that the $d1$ digit of the complement of the number of pulses to be transmitted will be entered upon the 5D flip-flop. When the α signal is again read out from the 5th slot of the E channel and in response to the following PH3 pulse, the 9X flip-flop will be either set in its 1 state or reset or maintained in its 0 state. This flip-flop is always restored to its 0 state in response to a positive output from the And gate 8G82 in response to the PH6 pulse received from the clock circuit after the 15th slot is read out and re-entered into the store.

Assume now that a 0 was read out from the D channel of the signal store in the 5th slot at this time and entered upon the 5D flip-flop. Then in response to the succeeding PH4 pulse an output will be obtained from the And gates 5G57 and 5G115. The output from the And gate 5G115 is transmitted through the Or gate 5G150 to the set input of the 5D flip-flop thus setting this flip-flop in its 1 state. As a result and in response to the succeeding PH5 pulse a 1 is entered in the 5th slot of the signal store by the 5D flip-flop at this time. Also in response to the PH5 pulse with the 9X flip-flop set in its 1 state a positive output is obtained from the And gates 6G60 and 9G133. The output from the And gate 9G133 is transmitted through the Or gate 9G167 to the set input of the 9L flip-flop, thus setting this flip-flop to its 1 state. Then in response to the PH4 pulse following the read out of the No. 15 slot the flip-flop 6F is set in its 1 state in response to positive output from And gate 7G69. As a result in response to the succeeding PH5 pulse a 1 is read in the signal store by the 6F flip-flop. Consequently the operations code is now changed from a "carry" code of 010 to the "send" code 011.

At this time a first pulse has been transmitted and the complement of the number of pulses to be transmitted has been increased by 1. The incrementing of the number in the digit received slot designated by the α signal has been completed since each bit starting with the least significant bit has been changed until a 0 was read out. This 0 is changed but the succeeding bits are not changed.

The sending circuits do not respond further to the 0 converter register space during the second, third, fourth, fifth, sixth, seventh and eighth passes. However, during the 9th pass when the No. 4 slot is read out and in response to the succeeding PH3 pulse the 9L flip-flop is again reset to its 0 state and then in response to the reading out of the No. 15 slot and the succeeding PH4 clock pulse the 6F flip-flop is reset to its 0 state so that in response to the succeeding PH5 clock pulse a 0 will be entered in the No. 2 slot position of the operations code thus changing this code again from the "send" code of 011 to the "carry" code 010. The circuits do not respond further to the information in the 0 converter register space during the tenth through fifteenth passes.

Then in response to the next 0 pass a second pulse will be transmitted to the step-by-step system by the monostable circuit 12M1 in a manner described above. In addition during the 0, 1, 2 and 3 passes the number stored in the digit slot designated by the α signal will be again incremented by 1 and then the above described process repeated, a pulse being transmitted during each 0 pass and thus at the rate of 1 pulse every $\frac{1}{10}$ of a second to the step-by-step system. In addition the number stored in the corresponding digit slot is incremented by 1 each time a pulse is transmitted.

When the number stored in the digit slot designated by α is 15, that is 1111, a pulse is transmitted to the step-by-step system in a manner described above. The incremnting of this number causes each 1 in turn to be changed to a 0 during the passes 0, 1, 2 and 3. At this time no 0 is found in any of these positions so that the flip-flop 9X will not be set in its 1 state during any one of these four passes 0, 1, 2 or 3. Consequently the 9X flip-flop is not set in its 1 position at the time of the succeeding PH5 pulse so that the 9L flip-flop likewise remains in its 0 state. Then in response to the reading out of the 15th slot and in response to the succeding PH4 pulse, the 6F flip-flop also remains in its 0 state so that the "carry" code is not changed to a "send" code. This indicates that the first digit has been transmitted so that it is now desirable to increment the "send" digit counter in slot No. 3 by 1.

The incrementing of this digit counter in slot 3 is accomplished during the Nos. 4, 5, 6, and 7 passes in a manner similar to the incrementing of the number in the digit slot during the 0, 1, 2 and 3 passes as described above.

Briefly when the No. 3 slot is read out during the fourth pass and in response to the PH2 pulse a positive output voltage will be obtained from the And gates 10G92 and 10G138 if the flip-flop 5D is in its 0 state in response to a 0 in the No. 3 slot of the D channel. Likewise a positive output will be obtained from the And gates 10G92 and 10G142 if the flip-flop 5D is in its 1 state due to a 1 being read out of the No. 3 slot of the D channel. A positive output from the And gate 10G138 sets flip-flop 9X in its 1 state while a positive output from the And gate 10G142 resets flip-flop 9X or maintains this flip-flop in its 0 state.

Then in response to the PH3 pulse the setting of the 5D flip-flop is changed. If this flip-flop was originally in its 0 state and caused the flip-flop 9X to be set in its 1 state then in response to the PH3 pulse this flip-flop will be set to its 1 state. Conversely, if the flip-flop 5D was set in its 1 state in response to reading out a 1 from the No. 3 slot of the D channel and caused the flip-flop 9X to be reset or maintained in its 0 state then in response to the PH3 pulse the flip-flop 5D is reset to its 0 state.

If a 0 is not read out then the above-described operations are repeated when the No. 3 slot is read out during the No. 5 pass. At this time the various digits in the No. 3 slot have been moved so that the $d1$ bit which was previously in the C channel during the fourth pass has now been moved to the D channel. Consequently, this bit will now be entered upon the 5D flip-flop instead of the $d0$ bit which was previously entered upon the 5D flip-flop during the No. 4 pass. Then in response to the PH2 and PH3 pulses the setting of the 5D flip-flop is reversed. If the 9X flip-flop is in its 1 state the 5D flip-flop is set in its 1 state. Conversely, if the 9X flip-flop is in its 0 state due to a 1 being read out and entered upon the 5D flip-flop then the 5D flip-flop will be reset to its 0 state.

If a 0 is not read out and entered upon the 5D flip-flop then a carry condition is indicated by the carry code and the above series of operations repeated when the No. 3 slot is read out during the No. 6 pass. At this time the $d2$ bit will have been moved to the D channel and read out and entered upon the 5D flip-flop. Then in response to the PH2 and PH3 pulses the setting of the 5D flip-flop is reversed and the 9X flip-flop actuated to its 1 state if a 0 is read out from the No. 3 slot and entered upon the 5D flip-flop. If the 0 is not read out then the same above-described operations are performed again when the No. 3 slot is read out during the No. 7 pass.

So long as a 0 is not read out and entered upon the 5D flip-flop during any of these passes the 9X flip-flop is not operated so that the flip-flop 8J, 8K and 9L all remain actuated to represent the "carry" code. That is the 8J and 9L flip-flops are in their 0 state and the 8K flip-flop is in its 1 state. Thus during the time the No. 13, No. 14 and No. 15 slots are read out during each of the passes 4, 5, 6 and 7 the same operations code remains in the 0, 1 and 2 slot of the E channel.

Under the conditions assumed above wherein the digit counter in slot No. 3 was set in the 0 state and the first digit had been fully outpulsed a 0 will be read out of the D channel during the fourth pass and entered upon the 5D flip-flop with the result that the flip-flop 9X will be set in its 1 state as described above. Under these circumstances in response to the succeeding PH4 pulse a positive output will be obtained from the And gate 9G85. The output from this And gate is transmitted through the Or gate 8G166 to the reset input of the 8K flip-flop and to the Or gate 9G167 to the set 1 input of the 9L flip-flop thus causing this flip-flop to be set in its 1 state and flip-flop 8K to be reset to its 0 state. At this time the setting of the 8J, 8K and 9L flip-flops represent the interdigital timing code IDT of 001.

Then in response to the PH4 pulse during the time the No. 14 slot is being processed the 6F flip-flop is reset to its 0 state and causes a 0 to be entered in the No. 1 slot of the E channel as described above. Similarly, during the time the No. 15 slot is being processed by the logic circuits, flip-flop 6F is set in its 1 state and causes a 1 to be entered in the third slot in the E channel of the signal store, thus causing the IDT code of 001 to be entered in the operations slots or positions in the 0 converter register space.

The changing of the operations code from a "carry" code to an IDT code will occur during some one of the passes 4, 5, 6 or 7 indicating that the binary representation of the number entered in the send digit counter in the No. 3 slot has been fully incremented to record the number of digits transmitted at this time.

Then during the time the No. 4 slot is read out during the following No. 9 pass and in response to the PH3 pulse a positive output will again be obtained from the And gate 9G91 and cause the flip-flop 9L to be again reset to its 0 state. Then in response to the PH4 pulse during the reading out of the No. 15 slot during this No. 9 pass the flip-flop 6F is reset in its 0 state so in response to the succeeding PH5 pulse a 0 will be entered in the No. 2 slot of the E channel, thus changing the operations code from an IDT code to a "check" code.

In this manner the 0 converter register space in combination with the logic circuits are conditioned to time a $\%_{10}$ second interval as the interdigital interval during which time no pulses will be transmitted, indicating to the step-by-step switches and equipment that the first digit has been completely transmitted to them.

As previously described in response to the PH2 pulse received from the clock circuit during the time the No. 4 slot is read out during the No. 4 pass a binary representation of the No. 10 was entered in the interdigital counter space in slot No. 4 of the 0 converter register space. This is the 16's complement of the No. 6. Thus during the next 6 complete cycles of 16 passes this counter will be incremented during which time no pulses are transmitted and which time represents the interdigital interval. During each of these cycles the number stored in the counting space will be incremented by 1 during the 0, 1, 2 and 3 passes. Thus during the 0 pass with the 8J, 8K and 9L flip-flops in their 0 state in response to the "check" code, flip-flop 9X will be set in its 1 state if flip-flop 5D is set in its 0 state in response to a 0 read out from the IDT counter slot No. 4. The 9X flip-flop is set in its 1 state in response to positive outputs from the And gates 9G90 and 9G137. Alternatively if the 5D flip-flop is set in its 1 state in response to a 1 having been read out of the IDT counter in slot No. 4 then in response to the PH3 pulse an output voltage is obtained from And gates 9G90 and 9G140 so the 9X flip-flop will be reset to its 0 state or maintained in its 0 state. Then in response to the succeeding PH4 clock pulse the state of the 5D flip-flop is changed. If this flip-flop was in its 0 state in response to a 0 read out from the IDT counter in slot 4 then this flip-flop will be set in its 1 state because the 9X flip-flop was previously set in its 1 state in response to the PH3 pulse. Alternatively, if the 5D flip-flop was set in its 1 state in response to the reading out of a 1 from the D channel of the IDT counter in slot 4 then the 9X flip-flop is reset or maintained in its 0 state so that in response to the clock pulse PH4 the 5D flip-flop is reset to its 0 state.

In response to the PH4 pulse at this time the 5D flip-flop is set in its 1 state by positive output obtained from the And gates 5G56 and 5G114 while the 5D flip-flop will be reset to its 0 state in response to an output from the And gate 5G56 and And gate 5G117.

If a 1 is read out from the D channel of the IDT counter in slot 4 and the 5D flip-flop set in its 1 state in response thereto, then the 5D flip-flop is reset and then in response to the succeeding PH5 pulse a 0 re-entered in this slot. The "check" code is not changed so that on the next or No. 1 pass the above-described operations are repeated. At this time, however, the information recorded in the various channels has been shifted thus the 0 previously recorded in the D channel of the 4 slot has been now shifted to the A channel, the digit previously recorded in the C channel in this slot is now moved to the D channel so that the 5D flip-flop will now be set in accordance with the next bit of the number recorded in the IDT counter space. If a 1 is read out the 5D flip-flop is set in its 1 state but not the 9X flip-flop. Then in response to the succeeding PH4 pulse the 5D flip-flop is reset to its 0 state. Then in response to the succeeding PH5 pulse a 0 will be entered in this slot of the D channel and thus again changing the character of the digit recorded therein. The above operations are then repeated for the No. 2 and No. 3 pass so long as a 0 is not read out from the slot in this pass at this time. The information recorded in the various channels of this slot is progressively shifted during each pass so that during the No. 2 pass the bit initially recorded in the B channel will be entered upon the 5D flip-flop. Then in response to the No. 3 pass the bit initially entered in the A channel in this slot will be entered upon the 5D flip-flop. The above operation continues from pass to pass until a 0 is read out and entered upon the 5D flip-flop, as a result a positive output will be obtained from the And gate 9G90 and 9G137 which positive output voltage is employed to set the 9X flip-flop in its 1 state.

Then in response to the succeeding PH4 pulse with the 9X flip-flop in its 1 state and the 8J, 8K and 9L flip-flops in their 0 states, an output will be obtained from the And gates 5G56 and 5G114 which sets the 5D flip-flop in its 1 state, thus reversing the state of this flip-flop. Then in response to the succeeding PH5 pulse a 1 will be entered in this slot in the corresponding channel. In addition in response to this PH5 pulse with the 9X flip-flop set in its 1 state, an output is obtained from the 6G60 And gate and the 9G134 And gate which positive output voltage is transmitted through the 9G167 Or gate to the set input of the 9L flip-flop thus setting this flip-flop in its 1 state. Then in response to the PH4 pulse from the clock circuit during the time the No. 15 slot is being processed by the logic circuits, a positive output from the 7G69 And gate causes the flip-flop 6F to be set in its 1 state and in response to the succeeding PH5 pulse a 1 is entered in the No. 2 slot of the E channel, thus changing the "check" code back to the IDT code indicating that the incrementing of the IDT counter has been completed during some one of the passes 0, 1, 2 or 3.

As assumed above the binary representation 1010 of the No. 10 had been previously entered in the IDT counter space so that upon the first 0 pass a 0 will be read out from the D channel of this slot thus causing the "check" code to be changed to an IDT code during the 0 pass. The circuits do not respond further to the various passes of this 0 converter register space until the No. 4 slot is read out during the No. 9 pass. At this time a positive output from the And gate 9G91 again resets the 9L flip-flop and then during the reading of the 15th slot of this pass a 0 is recorded in the No. 2 slot of the E channel in the first converter register space, thus changing the code from an IDT code of 001 to the "check" code 000. Then during the following 0 pass the above described operations of incrementing the number in the No. 4 slot are repeated. At this time a 1 will be read out and entered upon the 5D flip-flop both during the 0 and 1 passes. These two 1's are changed to 0's as described above and then on the 3rd pass the 0 initially entered on the B channel will be read out and changed to a 1 and then the "check" code changed back to the IDT code in the manner described above.

The above described operations are again repeated for 3 more complete cycles of 16 passes.

During the last pass a 1 will be read out and entered upon the 5D flip-flop during each of the passes 0, 1, 2 and 3, with the result that the 9X flip-flop will not be set in its 1 state during any of these passes. Consequently, the 9L flip-flop likewise will remain in its 0 state so that the "check" code is not changed to the IDT code.

Then during the No. 4 pass in response to the PH2 pulse following the read out of the No. 4 slot with the 8J and 8K flip-flops set in their 0 state an output is obtained from the And gate 4G46 again and in part to set the 4A and 5C flip-flops in their 1 state. Then in response to the following PH5 pulse the 1010 binary representation of the No. 10 is entered in the No. 4 slot which is the 16's complement of the No. 6, thus preparing this IDT counter for timing the next interdigital interval.

In response to the No. 5 pass the spacing of the $\alpha$ and $\beta$ signals is checked. If the $\beta$ signal is immediately adjacent to the $\alpha$ signal in the next slot than no $\alpha+1$ signal will be generated as described above. Then in response to the $\beta$ signal and in response to the PH3 pulse with the 10Y flip-flop the 9L flip-flop and the 8K flip-flop all in their 0 state, a positive output will be obtained from the And gate 9G88 which output is transmitted through the Or gate 8G161 to the set 1 input of the 8J flip-flop thus setting this flip-flop in its 1 state. In response to the PH4 pulse generated during the processing of the 13th slot during this 5th pass a positive output voltage is obtained from the And gate 7G67 so the 6F flip-flop will be set in its 1 state in the manner described above and cause a 1 to be written in the 0 slot of the E channel of the 0 converter register space, thus changing the operations code from a "check" code to a "start" code. Thereafter the circuits respond as described above in response to the "start" code. When additional digits are received the circuits will respond during the No. 5 pass to check the spacing of the $\alpha$ and $\beta$ signals. When additional signals have been received the $\beta$ signal will be moved so that $\alpha$ and $\beta$ will no longer be adjacent. Consequently an $\alpha+1$ pulse will be generated and the above-described operations repeated.

If additional signals have been received during the transmission of the first digit, then when the interdigital timing interval is timed and the 10L flip-flop not set in its 1 state during any of the passes 0, 1, 2 or 3 as described above, and in response to the No. 5 pass an $\alpha+1$ signal will be generated and this signal together with a PH3 clock pulse and the 8K flip-flop in its 0 state will cause an output from the And gate 10G96 which output, as described above, is transmitted to the set 1 input of the 10Y flip-flop thus setting this flip-flop in its 1 state. The output of the And gate 10G96 is also transmitted to the reset input of the 8J flip-flop. With "check" code recorded on the 8J, 8K and 9L flip-flops, the positive output from the 10G96 And gate transmitted to the reset input of the 8J flip-flop merely leaves its flip-flop in its 0 state. Thus the "check" code or 000 remains set upon the 8J, 8K and 9L flip-flops and remains stored in the operations code position in the 0 converter register space in the signal store.

Then during the No. 6 pass with the 8J, 8K and 9L flip-flops in their 0 state in response to the "check" code the 6E flip-flop will be reset in response to reading out the $\alpha$ signal in the PH3 clock pulse. Then in response to the PH5 clock pulse a 0 is recorded in this slot of the E channel in the signal store. During the processing of the next slot and in response to the voltage on the $3\alpha+1$ conductor and the PH3 clock pulse and with the 8J and 8K and 9L flip-flops still in their 0 state positive voltage is again obtained from the 6G63 and 6G123 And gates which voltage causes the flip-flops 6E and 10Y to be set in their 1 states. Then with the 10Y flip-flop in its 1 state a positive output will be obtained in response to the PH4 clock pulse from the And gate 9G84. This voltage as before causes the flip-flops 8K and 9L to be set in their 1 state. Then in response to the PH5 clock pulse a 1 is written in the E channel designating the next digit to be transmitted. Thus the $\alpha$ signal has been advanced 1 slot. Then during the time the No. 14 slot is being processed by the equipment the 6F flip-flop is set in its 1 state since the 8K flip-flop is in its 1 state as described above. Thus a 1 is written in the No. 1 slot of the E channel. Similarly, since the 9L flip-flop is also in its 1 state a 1 will be written in the No. 2 slot of this channel during the time the 15th slot is being processed by the equipment. Thus the "check" code has now been changed to a "send" code. Then during the time the No. 4 slot is being processed during the No. 9 pass this "send" code is changed to a "carry" code as described above, thus conditioning the system to transmit this next digit. Thereafter the system responds as described and transmits the pulses representing the second digit. One pulse being transmitted during each 0 pass and then during the same 0 pass and the succeeding No. 1, No. 2, and No. 3 passes 1 is added to the 16's complement of the number of pulses to be transmitted. When all of the pulses of this second digit have been transmitted, the send digit counter in slot No. 3 is incremented so that the binary representation of 2 will be entered in this slot. Then the interdigital interval is again timed in the manner described above, after which the third digit is transmitted if it has been previously received in the manner described above.

When the first three digits of a call have been received the prefix codes for these digits will be entered in the 0, 1 and 2 slots of the A, B and C channels. In addition a 1 will be recorded in these slots in the D channel indicating that these three digits have all been received. Also the 16's complement of the received digits will be entered in the A, B, C and D channels of slots 5, 6 and 7 in the manner described above.

If the first three digits indicate that the call is a revertive call then it is necessary to signal the control circuits such as 103 and this circuit in turn signal other control circuits, where necessary, that the first on-hook signal will not indicate a disconnect or an abandonment call but merely permit the ringing of the other subscriber on the calling line.

Thus, during the ninth pass after the third digit has been received and entered in the converter register space as described above during any one of the passes 0, 4, 8 or 12, the No. 2 slot of this converter register space is read out an output will be obtained from the And gate 8G78 and either 8G163 or 8G164 if the call is a revertive call. The output from either of these And gates 8G163 or 8G164 is transmitted through the Or circuit 8G210 and over conductor 8–210 to the And gate 12G211 and then to the converter control circuits to indicate that the call is a revertive call.

When the first three digits of the call have been all transmitted it is desirable to determine the total number of digits to be expected in the call. In the case of 0 operator's call, of course, only one digit is received and transmitted in the manner described herein.

Assume now that all but the last pulse of the third digit has been transmitted. During the 0 pass during this last pulse is transmitted and the succeeding No. 1, No. 2, and No. 3 passes, 1's will be read out on the 5D flip-flop from all of the channels of the No. 7 slot wherein this digit was recorded. Consequently a carry will be obtained at the end of the processing of the No. 7 slot where the signal α is recorded in the fifth channel at this time.

As a result it is desirable to increment the send digit counter in slot 3 to indicate that three digits had been sent. As described herein the incrementing of the send digit counter occurs during the No. 4, No. 5, No. 6 and No. 7 passes. In this case, however, since the number to be recorded is 3 the incrementing will be completed during the No. 4 pass. Prior to this pass the number recorded in this counter will be 0010 representing 2. Then during the No. 4 pass the 0 in the D channel will be changed to a 1 so that the number now recorded will be 0011 representing 3 thus completing the incrementing of the send digit counter during this No. 4 pass. Thus during this fourth pass with the 5D flip-flop in its 0 state in response to the 0 read out of the D channel and in response to the PH2 pulse during the processing of the No. 3 slot positive voltage will be obtained from And gates 10G92 and 10G138 as described above and cause the flip-flop 9X to be set in its 1 state. Then in response to the PH3 pulse the 5D flip-flop is set in its 1 state so a 1 will be recorded in this slot of this channel. Then in response to the succeeding PH4 pulse, with the 9X flip-flop set in its 1 state, an output is obtained from the 9G85 And gate which is transmitted to the set input of the 9L flip-flop and the reset input of the 8K flip-flop. As a result the IDT code is entered upon the J, K and L flip-flops instead of the "carry" code.

Normally during the following ninth pass in response to the PH3 pulse during the time the fourth slot is being processed the IDT code is changed to the "check" code by a positive output from the And gate 9G91 as described above.

However, in the case that three digits have been outpulsed then in response to the PH2 pulse during the No. 7 pass when the No. 3 slot is read out, outputs will be obtained from the And gate circuits 10G7 and 10G97. The outputs are obtained from these And gates due to the fact that the 4A and 5D flip-flops are in their 0 states, 4B and 5C flip-flops are in their 1 states, the 8K flip-flop is in its 0 state and the 9L flip-flop is in its 1 state. The 8K flip-flop is in its 0 state and the 9L flip-flop is in its 1 state in response to the IDT code entered upon these flip-flops at this time. The A, B, C and D flip-flops are in the state described above due to the binary 3 recorded in the send digit counter of slot 3 in response to transmitting the third digit as described above. At this time the information in the A, B, C and D channels have been shifted three spaces to the right since this operation occurred during the No. 7 pass. The binary representation of the No. 3 is 0011 which would be entered in the corresponding channels A, B, C and D during 0, 4, 8, and 12 passes when the bits of the number are in their normal positions. When these bits are shifted one position to the right the number will be 1001 when they are shifted two positions to the right the number will be 1100 and when they are shifted three positions to the right the number 3 is represented by 0110 as entered upon the 4A and 4B and 5C and 5D flip-flops. Thus, as described above, when the No. 3 slot is read out during the No. 7 pass after three digits have been fully transmitted and the send digit counter incremented to represent the number 3 a positive output from the And gate 10G97 is transmitted to the set input of the 10Y flip-flop thus setting this flip-flop in its 1 state. Then in response to the succeeding PH4 pulse with the 10Y flip-flop in its 1 state, the flip-flop 9L is reset to its 0 state in response to a positive voltage from the And gate 7G66. As a result, the code entered upon the J, K and L flip-flops is changed from the IDT code to the "check" code. Then during the time the No. 13, No. 14 and No. 15 slots are processed by the logic circuits during the No. 7 pass the "check" code is written in the 0, 1 and 2 slots of the E channel in the manner described herein.

Thereafter, during the No. 9 pass the first three digits are decoded and the proper binary representation of the 16's complement of the number of digits remaining to be transmitted for the call entered in the send digit counter in slot No. 3. Thus, if a 1 is read out of the D channel and entered upon the 5D flip-flop from the No. 0 slot in the 0 converter register space, the 9X flip-flop is set in its one state in response to positive output voltage obtained from the And gates 10G93 and 9G139. The 5D flip-flop will be set in its 1 state during the No. 9 pass in response to a 1 entered in the 0 slot of the C channel. This channel has been shifted one slot to the right during the No. 9 pass so that it will be read out and entered upon the 5D flip-flop. A 1 entered in the 0 slot of the C channel indicates that the first digit was a 1 since this first digit cannot be a 0 otherwise it would be considered an operator's call which cannot be translated because only one digit is transmitted for such an operator's call, and three digits must be transmitted before the following translation may be performed by the equipment of the specific embodiment of our invention.

Similarly, in response to the reading out of the second slot, the 10Y flip-flop is set in its 1 state by the positive output voltage from the And gate 10G143, if the 5D flip-flop is similarly set in its 1 state due to a 1 having been previously recorded in the C channel of the No. 1 slot which indicates that the second received digit was either a 0 or a 1. Both the 9X flip-flop and the 10Y flip-flop are set in their 1 states in response to the PH2 clock pulse received following the reading out of the respective slots No. 0 and No. 1.

Then in response to the PH3 clock pulse following the reading out of the information recorded in the No. 2 slot during the 9th pass, positive output voltage is obtained from gate 10G99 because the 8J, 8K and 9L flip-flops are all in their 0 states in response to the "check" code. As a result, the 10Z flip-flop is set in its 1 state.

Then in response to the succeeding PH4 clock pulse 1 or more of the flip-flops 8J, 8K and 9L is set in its 1 state depending upon the condition of the various flip-flops 4B, 5C, 5D, 9X, 10Y and 10Z as shown in the Table D.

The response of the system to a single digit or 0 operator's code has been described above.

If a three digit code is received the 9X flip-flop and the 10Y flip-flop will be set in their 1 states as is the 10Z flip-flop as described. Then in response to the PH4 pulse of the No. 2 slot of the No. 9 pass the 8K flip-flop is set in its 1 state so the 8J, 8K and 9L flip-flops are now set to represent the "carry" code. Then in response to the PH2 pulse of slot No. 3 of pass No. 9 the 10Z flip-flop is restored to its 0 state so no further translations are necessary or are made. Instead, in response to the PH2 pulse of the No. 4 slot of this No. 9 pass the "carry" code is changed to the "clear" code and the converter initialized as described below.

If the received code does not designate either a single digit call or a three digit call, then when the No. 3 slot is read out during this No. 9 pass and in response to the PH3 pulse, the flip-flops 4A, 4B, 5C and 5D are reset or set as required to enter the proper binary notation in the send digit counter in slot No. 3. The various combinations of the settings of the various flip-flops in response to the received digits is shown in the following Table D:

response to a positive output from the 9G88 And gate which sets the 8J flip-flop in its 1 state in the manner described herein. The system then operates in a manner described above with the 0 converter register space remaining in its start condition and no further action takes place until succeeding digits or calling signals have been received from the calling subscriber. When such signals are received the system responds to them in the manner described herein.

Alternatively, if additional calling signals have been received so that the $\alpha$ and $\beta$ signals are not in adjacent slots, then in response to the $3\alpha+1$ positive voltage derived from the And gate 3G102 then in response to the PH3 clock pulse a positive voltage output is obtained from the And gate 10G96 which voltage is employed to set the 10Y flip-flop in its 1 state and to reset the 8J flip-flop to its 0 state or maintain this flip-flop in its 0 state. In the assumed condition this flip-flop will remain in its 0 state, thus continuing the setting of the 8J, 8K and 9L flip-flops to represent the "check" code.

Then during the succeeding No. 6 pass the $\alpha$ signal is advanced 1 slot in the manner described above, and the 8K and 9L flip-flops set in their 1 state. During the processing of the No. 14 and No. 15 slots the operation code in slots 0, 1, and 2 in the fifth channel in the store is changed to the "send" code. Thereafter, the succeeding digit is sent in the manner described above.

When all of the expected digits of the call have been transmitted in the manner described above and the send digit counter incremented and restored to all 0's in the

TABLE D

| Digit 1 2 3 4 5 6 7 8 9 10 11 | Digit in Call | Remaining Digits to be Sent | Send Digit Counter Setting | Send Digit Counter as Advanced for the No. 9 Pass | Flip-Flop Set From Store Slot 2 | Flip-Flops Sets Slot 2 | Flip-Flops Sets Slot 3 |
|---|---|---|---|---|---|---|---|
| 0 | 1 | | | | $4B', 5C',$ $9X, 10Y, \overline{10Z}$ | | |
| 1 1 X | 3 | | | | | 8K | 10Z |
| 1 1 9 X  ⎫ Revertive | 4 | 1 | 1111 | 1111 | $4B,$ $9X, \overline{10Y}, \overline{10Z}$ | 8J, 8K, 9L | 4B, 5C |
| 1 1 8 X X ⎭ Codes | 5 | 2 | 1110 | 0111 | $\overline{\phantom{9X,}}$ $5C$ $\overline{\phantom{10Z}}$ $\overline{9X}, 10Y, \overline{10Z}$ | 8J, | 4A', 4B, 5C |
| A B X X X X X | 7 | 4 | 1100 | 0110 | $\overline{9X'}, \overline{10Y'}, \overline{10Z}$ | 8J | 4A', 4B, 5C, 5D' |
| 1- A B X X X X X | 8 | 5 | 1011 | 1101 | $5D$ $\overline{9X}, \overline{10Y'}, 10Z$ | 8K, 9L | 4B |
| X 0/1 X A B X X X X X | 10 | 7 | 1001 | 1100 | $\overline{9X'}, \overline{10Y'}, \overline{10Z}$ | 9L | 4B, 5D' 4A', 4B, 5D' |
| 1- X 0/1 X A B X X X X X | 11 | 8 | 1000 | 0100 | | | |

Then with the 10Z flip-flop in its 1 state and in response to the PH4 clock pulse received during the processing of the No. 3 slot during the ninth pass, a positive output will be obtained from the And gate 8G80 which voltage is employed to reset the flip-flop 8J and 8K to their 0 state.

Next in response to the PH3 pulse received from the clock circuit after the No. 4 slot has been read out during this ninth pass a positive output will be obtained from the And gate 9G91 which positive output is applied to the reset input of the flip-flop 9L thus restoring or maintaining this flip-flop in its 0 state. As a result the "check" code is now entered on the flip-flops 8J, 8K and 9L, since these flip-flops are now all in their 0 state. This code is then entered in the 0, 1 and 2 slots of the E channel during the processing of the No. 13, No. 14 and No. 15 slots of this 0 converter register space.

Then with the "check" code recorded in the operations code storage spaces the interdigital interval is timed during the various Nos. 0, 1, 2 and 3 passes in the manner described above.

During the next succeeding No. 5 pass of this 0 converter register space after this interval has been timed, the relative positions of the $\alpha$ and $\beta$ signal are checked. If the $\alpha$ and $\beta$ signals are in adjacent slots indicating that no further digits have been received for transmission, then the "check" code is changed to the "start" code in manner described above with reference to the IDT counter and also with reference to the count in the stored digit slots the 9X flip-flop will not be set in its 1 state in response to the PH2 pulse received from the clock circuit during the processing of the No. 3 slot during any of the passes Nos. 4, 5, 6 or 7. Consequently, the "carry" code is not changed to the IDT code in response to the PH4 pulse. Then during the processing of the No. 4 slot during the ninth pass and in response to the PH2 pulse with the 8K flip-flop in its 1 state and the 9L flip-flop in its 0 state, an output is obtained from the And gate 8G79 which output is employed to set the 8J flip-flop in its 1 state thus changing the "carry" code to the "clear" code. This "clear" code is then entered in the 0, 1 and 2 slots of the E channel during the time the No. 13, No. 14 and No. 15 slots are being processed during this ninth pass.

During the following No. 10 pass and in response to the PH2 clock pulse received during the time each of the slots is being processed during this pass an output is obtained from the 4G48 And gate which output is employed to reset the flip-flops 4A, 4B, 5C, 5D and 6E. Then in response to the succeeding PH5 pulse during the processing of each of the slots during this pass, 0's will be read in the corresponding slots in these channels in the 0 converter register space.

During the time the No. 3 slot is being processed during this tenth pass in the above-described manner the synchronizing spot in the No. 5 or E channel will be read out and entered upon the 6E flip-flop in response to the PH1 clock pulse. If a 1 is read out and entered upon the 6E flip-flop at this time, then in response to the PH2 clock pulse an output will be obtained from the And gate 9G87 and employed to set the 9L flip-flop in its 1 state, since the flip-flops 6E and 8J and 8K are now in their 1 state.

Then in response to the PH3 pulse the flip-flops 4A, 4B, 5C, 5D and 6E are set in their 0 states in the manner described above.

In response to the succeeding PH4 pulse with the flip-flops 8J, 8K and 9L set in their 1 states, an output is obtained from the And gate 6G64 which output is employed to again set the 6E flip-flop in its 1 state.

Then in response to the PH5 pulse, 0's are recorded in the No. 3 slot of all of the channels except the No. 5 or E channel. A 1 is recorded in this slot in the E channel in response to the assumed conditions.

If an 0 had been previously recorded in this channel then the E flip-flop will not be in its 1 state when the PH2 clock pulse is received as described above. Consequently, the 9L flip-flop is not set in its 1 state so that the E flip-flop likewise will not be set in its 1 state in response to the PH4 clock pulse. Under these circumstances a 0 will be recorded in the No. 3 slot of the E channel.

Thus if a 0 had been recorded in the synchronizing spot then a 0 remains recorded in this spot at the completion of the tenth pass. If a 1 had been previously recorded in this synchronizing spot then a 1 will remain recorded in this spot after the No. 10 pass. In addition 0's will be recorded in all of the other channels of this slot.

Next during the eleventh pass and in response to the PH2 clock pulse received during the time the No. 4 slot is being processed a positive output voltage will be obtained from the 4G50 And gate since the 8J and 8K flip-flops are set in their 1 state at this time, in response to the "synchronizing rewrite" code. The output from the 4G50 And gate is employed to set the 4B, 5D, and 6E flip-flop in their 1 state. Then in response to the following PH5 pulse, 1's are recorded in the B channel, the D channel and the E channel of the No. 4 slot. The 1 in the E channel in the No. 4 slot is the α signal while the 1 in the B and D channel is the binary representation of the No. 10 moved three channels to the right as seen in FIG. 14. Since this is the No. 11 pass the channels have been moved three spaces or channels to the right.

Then in response to the PH2 clock pulse received when the No. 5 slot is being processed during this eleventh pass and with the 8J and 8K flip-flops in their 1 states, positive output voltage is obtained from the And gate 7G65. The positive output from the And gate 7G65 is employed to set the 6E flip-flop and the 9X flip-flop in their 1 states. Then in response to the succeeding PH3 pulse and with the 9X flip-flop set in its 1 state an output is obtained from the And gate 8G81 which output resets the flip-flops 8K and 9L to their 0 states. In response the following PH5 pulse with the 6E flip-flop in its 1 state a 1 will be written in the No. 5 slot in the E channel, this 1 comprises a β signal.

The output from the 7G65 And gate is also transmitted over a conductor 7–65 to the And gate 12G202. The other input to this And gate has positive potential applied to it at this time over the 2C0 conductor. Consequently, an output will be transmitted over the release 0 conductor to the control circuits 103 of the first converter 123 thus signaling this converter that the converter register space and related equipment has been restored to its initial condition and is ready to receive an additional call.

During the time the No. 13, No. 14 and No. 15 slot of this 0 converter space are being processed during this No. 11 pass the "start" signal comprising a 100 will be recorded in the No. 0, No. 1 and No. 2 slots of the E channel thus completely restoring the converter register space to its initial condition.

If a call is abandoned the control circuits 103 cause positive voltage to be applied to the abandoned 0 conductor which voltage in turn is transmitted, in response to the PH5 pulse during the processing of the No. 3 slot during succeeding No. 9 pass, through the And gate 12G156 and Or gate 12G200 over the conductor 12–200 to the set 1 input of the 8K flip-flop and the reset input of the 9L flip-flop. Then in response to the PH2 clock pulse during the time the No. 4 slot is being processed during this same No. 9 pass the 8J flip-flop is set in its 1 state in response to a positive output voltage received from And gate 8G79 in response to the PH2 clock pulse since the 8K flip-flop is in its 1 state and the flip-flop 9L is in its 0 state. The 8J, 8K and 9L flip-flops are now set in accordance with the "clear" code. The circuit then responds as described above and restores the register space and circuit to their initial condition in which they are ready to receive the next call.

It is to be understood that the above-described arrangement is illustrative of the application of the principles of the invention. Numerous other arrangements may be devised by those skilled in the art without departing from the spirit and scope of the invention.

What is claimed is:

1. In a communication switching system in combination, a signal converter comprising a multielement code signal receiver, a circulating store having a plurality of multiposition channels, means connected between said receiver and said store for inserting representations of a received multielement code concurrently in said plurality of channels, means for advancing concurrently the position of each of the inserted representations, means for transmitting signals from said signal converter representing said received codes, and control means comprising means for advancing the position of the representations stored in all of said channels in sequence, means for modifying said stored representations in response to said sequentially advancing representations and means operative upon receipt of said stored representations for controlling said signal transmission means.

2. In a signal converter in combination, a signal receiver, means for representing received signals by multielement codes, a multichannel circulating store, apparatus for conveying the elements of each of said codes in parallel to the channels of said store, means for circulating information stored in each of said channels, means connected between said channels for advancing the information stored in one of said channels to the next of said channels, apparatus for transmitting signals from said signal converter representing said received signals, means responding to the sequentially advancing information received from said channels for controlling said signal transmitting apparatus and for altering said sequentially advancing information, and means for storing said altered sequentially advancing information in said multichannel circulating store.

3. In combination in a circulating store, a plurality of storage channels, means for circulating a plurality of bits in said channels in parallel, means for inserting a plurality of bits representing a word in said channels, means for moving the bits one bit position in each channel on successive cycles of said circulating store to circulate the bits of said words in sequence through said store, means for reading out the bits from said storage channels in succession, and control means responsive to receipt of the bits read out successively from said storage channels for modifying said stored words and for recording a plurality of circulating store control bits in said channels.

4. In combination in a circulating store according to claim 3 wherein said control means further comprises means for adding one to selected words comprising means for contemplating said successively read out bits of each selected word beginning with the least significant bit, and means responsive to the detection of a binary zero occurring in said selected word for inhibiting the complementing of the remaining bits of said selected word.

5. In combination in a circulating store, a plurality of storage channels, apparatus responsive to received signals for storing binary representations in a plurality of said channels in parallel, apparatus for transmitting signals representing said received signals, and control means responsive to said binary representations received serially from a plurality of said channels for controlling the signals transmitted by said signal transmission apparatus and for modifying serially said binary representations, said control means further comprising means for storing said serially modified binary representations in said plurality of channels.

6. In combination in a signal converter, a circulating store comprising a plurality of storage channels, means for receiving signals representing multielement codes, means for recording representations of received signals in said channels in parallel, means for transmitting signals representing said received signals, and means responsive to said recorded representations obtained from a plurality of said channels in a successive sequence for controlling said signal transmitting means and said circulating store.

7. In combination in a circulating store, a plurality of signal storage channels, an additional control storage channel, means for circulating information stored in all of said channels in parallel, apparatus for storing information in said control channel designating idle storage spaces in said signal storage channels, means for recording information in said signal storage channels under control of said information in said control channel, and means for altering said information in said control channel to designate other idle storage spaces in said signal storage channels in response to the recording of information in the spaces of said signal storage channels designated by said information recorded in said control channel.

8. In combination in a circulating store in accordance with claim 7 wherein means are provided for controlling the storing of information in said control channel for designating the location of information to be read out of said signal channels and wherein there are means controlled by said stored information in said control channel for reading out the designated information from said signal channels.

9. In combination in a circulating store in accordance with claim 8 wherein means are provided responsive to the relative location of said information in said signal channels and said information stored in the control channel to further control the reading out of the information at the designated location in said signal channels.

10. In combination in a circulating store in accordance with claim 9 wherein means are provided for changing the information stored in said signal storage channels serially bit by bit and means are provided for transmitting said information in all of said signal storage channels in a successive sequence to said means for changing the stored information.

11. In a signal converter in combination, a signal receiver responsive to receipt of multifrequency signals, a multichannel circulating store having signal storage channels for storing information, apparatus for storing information representing received multifrequency signals concurrently in a plurality of said channels, means for circulating the information stored in each of said channels concurrently, means connected between said channels for advancing the information stored in one of said channels to the next of said channels, a control channel for storing control information, means for circulating said control information in said control channel concurrently and in synchronism with said information stored in said signal storage channels, and control means responsive to said control information and the information stored in said signal storage channels during different circulations thereof for controlling said converter.

12. In a signal converter in combination, a multichannel circulating store having a plurality of signal storage channels for storing signaling information and means for circulating the information stored in each of said channels, means connected between said channels for advancing the information stored in one of said channels to the next of said channels, counting means comprising elements of said storage channels for counting the number of circulations of the information stored in said channels, and control means responsive to said counting means for performing different control operations during different circulations of the information in said store.

13. In a signal converter in accordance with claim 12 wherein said circulating store additionally has a control channel for storing control information; said circulating means includes means for circulating the information in said control channel in synchronism with the circulation of information in said signal storage channels; and wherein said control means is responsive to information stored in said control channel, said signal storage channels, and said counter to control the operations of said converter.

14. In a signal converter in accordance with claim 12 wherein said counting mean comprises a counter operating independently of said store, and means for comparing the contents of said counter operating independently of said store and the contents of said counter comprising elements of said store.

15. In a signal converter in accordance with claim 12 in combination with a multifrequency signal receiver connected to said store, apparatus for transmitting signals representing multifrequency signals from said signal converter, and means responsive to the serial sequence of information recorded in a plurality of said signal channels during sequential circulations for controlling said signal transmitting apparatus and for altering the information stored in said signal channels.

References Cited by the Examiner

UNITED STATES PATENTS

| | | | |
|---|---|---|---|
| 2,788,443 | 4/1957 | Ruhlig | 340—173 X |
| 2,805,409 | 9/1947 | Mader | 340—174 X |
| 2,870,429 | 1/1959 | Hales | 340—173 X |
| 3,108,193 | 10/1963 | Schreiner | 328—37 X |
| 3,133,155 | 5/1964 | Kuchas | 179—18 |

KATHLEEN H. CLAFFY, *Primary Examiner.*

L. A. WRIGHT, *Assistant Examiner.*